United States Patent
Wu et al.

(10) Patent No.: US 11,212,676 B2
(45) Date of Patent: Dec. 28, 2021

(54) USER IDENTITY PRIVACY PROTECTION IN PUBLIC WIRELESS LOCAL ACCESS NETWORK, WLAN, ACCESS

(71) Applicant: Telefonaktiebolaget LM Ericsson (publ), Stockholm (SE)

(72) Inventors: Changzheng Wu, Shenzhen (CN); Samy Touati, Pleasanton, CA (US)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 308 days.

(21) Appl. No.: 16/463,774

(22) PCT Filed: Nov. 21, 2017

(86) PCT No.: PCT/IB2017/057300
§ 371 (c)(1),
(2) Date: May 23, 2019

(87) PCT Pub. No.: WO2018/096449
PCT Pub. Date: May 31, 2018

(65) Prior Publication Data
US 2019/0380033 A1 Dec. 12, 2019

Related U.S. Application Data

(60) Provisional application No. 62/425,849, filed on Nov. 23, 2016.

(51) Int. Cl.
*H04L 29/06* (2006.01)
*H04W 12/069* (2021.01)
(Continued)

(52) U.S. Cl.
CPC ....... *H04W 12/069* (2021.01); *H04L 63/0823* (2013.01); *H04L 63/0892* (2013.01);
(Continued)

(58) Field of Classification Search
CPC ............. H04W 12/069; H04W 12/108; H04W 12/0431; H04W 88/16; H04W 12/06;
(Continued)

(56) References Cited

U.S. PATENT DOCUMENTS

2007/0022476 A1   1/2007  Bae et al.
2009/0305671 A1*  12/2009 Luft ..................... H04W 12/08
                                                           455/411
(Continued)

FOREIGN PATENT DOCUMENTS

CN    101227494 A  *  7/2008
CN    101841888 A  *  9/2010  ............ H04W 48/16
(Continued)

OTHER PUBLICATIONS

J. Arkko et al.: "Extensible Authentication Protocol Method for 3rd. Generation Authentication and Key Agreement (EAP-AKA)"; RFC 4187; Geneva, Switzerland; Jan. 2006; 79 pages.
(Continued)

*Primary Examiner* — John B King
(74) *Attorney, Agent, or Firm* — Sage Patent Group

(57) ABSTRACT

Systems and methods relating to providing identity privacy over a trusted or untrusted non-3GPP access network in a wireless communication system are disclosed. In some embodiments, a method of operation of a wireless device comprises sending a message to a gateway (ePDG, N3IWF or TWAG) where the message comprises an anonymous user identity; receiving a request for obfuscating the user identity wherein the request comprises a server certificate; and validating the server certificate and sending a response message back to the gateway, comprising the user identity obfuscated by a public key associated with the server certificate. Similar methods are provided on the gateway side and AAA server side. In this manner, the user identity
(Continued)

is protected when establishing the connection to the core network and protects against a man in the middle attack.

9 Claims, 11 Drawing Sheets

(51) Int. Cl.
  *H04W 88/16* (2009.01)
  *H04W 12/108* (2021.01)
  *H04W 12/0431* (2021.01)
(52) U.S. Cl.
  CPC ..... *H04W 12/0431* (2021.01); *H04W 12/108* (2021.01); *H04W 88/16* (2013.01)
(58) Field of Classification Search
  CPC ............... H04W 12/02; H04L 63/0823; H04L 63/0892; H04L 63/1466; H04L 2209/42; H04L 2209/80; H04L 9/0841; H04L 9/321; H04L 9/3268; H04L 63/0414; G06F 21/33
  See application file for complete search history.

(56) References Cited

U.S. PATENT DOCUMENTS

| 2011/0076991 | A1* | 3/2011 | Mueck | H04L 1/0032 455/414.1 |
| 2016/0285627 | A1* | 9/2016 | Sedlacek | H04L 43/0817 |
| 2017/0134444 | A1* | 5/2017 | Buckley | H04W 12/069 |

FOREIGN PATENT DOCUMENTS

| CN | 102547688 A | * | 7/2012 | |
| CN | 102624530 A | * | 8/2012 | |
| CN | 101820656 B | * | 10/2012 | |
| CN | 103095710 A | * | 5/2013 | |
| CN | 107466465 A | * | 12/2017 | ............ H04L 69/28 |
| CN | 107615825 A | * | 1/2018 | ............ H04L 9/0819 |
| CN | 108029016 A | * | 5/2018 | ............ H04W 4/10 |
| FR | 2847102 A1 | * | 5/2004 | ......... H04L 63/0407 |
| JP | 2004032311 A | * | 1/2004 | ........ H04L 63/0272 |
| KR | 20180023913 A | * | 3/2018 | ........ H04L 63/0892 |
| WO | WO-2008095918 A1 | * | 8/2008 | ............ H04W 76/50 |
| WO | WO-2009024048 A1 | * | 2/2009 | ............ H04M 15/55 |
| WO | WO-2009121407 A1 | * | 10/2009 | ........ H04W 12/0431 |
| WO | WO-2010045985 A1 | * | 4/2010 | ............ H04L 63/08 |
| WO | WO-2011054147 A1 | * | 5/2011 | ............ H04L 63/08 |
| WO | WO-2012095179 A1 | * | 7/2012 | ......... H04L 12/4625 |
| WO | WO-2015103170 A1 | * | 7/2015 | ............ H04W 4/21 |
| WO | WO-2016085001 A | * | 6/2016 | ............ H04W 12/02 |

OTHER PUBLICATIONS

3GPP TSG-RAN WG5, Meeting #47, R5-103579; Montreal, Canada; May 10-14, 2010; 13 pages.
3GPP TR 23.799 V1.1.0 (Oct. 2016): 3rd Generation Partnership Project; Technical Specification Group Services and System Aspects; Study on Architecture for Next Generation System, (Release 14); Oct. 2016; 503 pages.
3GPP TS 23.003 V14.1.0 (Sep. 2016): 3rd Generation Partnership Project; Technical Specification Group Core Network and Terminals; Numbering, addressing and identification, (Release 14); Sep. 2016; 103 pages.
3GPP TS 23.402 V14.1.0 (Sep. 2016): 3rd Generation Partnership Project; Technical Specification Group Services and System Aspects; Architecture enhancements for non-3GPP accesses, (Release 14); Sep. 2016; 306 pages.
3GPP TS 29.273 V14.0.0 (Sep. 2016): 3rd Generation Partnership Project; Technical Specification Group Core Network and Terminals; Evolved Packet System (EPS); 3GPP EPS AAA interfaces, (Release 14); Sep. 2016; 181 pages.
3GPP TS 33.402 V14.0.0 (Dec. 2016): 3rd Generation Partnership Project; Technical Specification Group Services and System Aspects; 3GPP System Architecture Evolution (SAE); Security aspects of non-3GPP accesses; (Release 14); Dec. 2016; 68 pages.
C. Kaufman et al.: "Internet Key Exchange Protocol Version 2 (IKEv2)"; RFC 5996; Sep. 2010; 138 pages.
J. Arkko et al.: "Improved Extensible Authentication Protocol Method for 3rd. Generation Authentication and Key Agreement (EAP-AKA')"; RFC 5448; May 2009; 29 pages.
S. Kent et al.: "Security Architecture for the Internet Protocol"; RFC 4301; Dec. 2005; 101 pages.
B. Aboba et al.: "Extensible Authentication Protocol (EAP)"; RFC 3748; Jun. 2004; 67 pages.
IEEE Std. 802.1X-2010: IEEE Standard for Local and metropolitan area networks—Port-Based Network Access Control; Feb. 5, 2010; 222 pages.

* cited by examiner

US 11,212,676 B2

USER IDENTITY PRIVACY PROTECTION IN PUBLIC WIRELESS LOCAL ACCESS NETWORK, WLAN, ACCESS

RELATED APPLICATION

This application claims the benefit of provisional patent application Ser. No. 62/425,849, filed Nov. 23, 2016, the disclosure of which is hereby incorporated herein by reference in its entirety.

TECHNICAL FIELD

This disclosure relates generally to security in Wireless Local area networks, WLAN and more specifically to user privacy in WLAN.

BACKGROUND

Third Generation partnership project, 3GPP, describes an architecture allowing a user to connect to his or her mobile operator services using his or her user equipment, UE, over a WLAN supporting Wireless Fidelity, WiFi™, access. The user accesses the mobile operator services by allowing the UE to connect over the WLAN to the operators Evolved Packet Core, EPC, network as described in 3GPP Technical Specification, TS 23.402. Once connected to the EPC, the user can have access to his/her services. From the mobile operators perspective, the WLAN may be trusted or untrusted.

The trusted WLAN access supports Institute of Electrical and Electronics Engineers, IEEE 802.1x and extended Authentication Protocol, EAP, authentication between the EAP client in the UE and the EAP server in the WLAN network (mainly, an Authorization, Authentication, Accounting, AAA, sever). The trusted WLAN supports Medium Access Control, MAC, level WLAN access security. The authentication allows the UE to connect to mobile operator's EPC securely through a WLAN gateway (Trusted WLAN Access Gateway, TWAG). In the 3GPP definition, the trust on the WLAN access relies more on WLAN abilities and actual network deployment to meet the mobile operator's requirements, especially, the security requirement provided to its end users.

When the UE accesses the trusted WLAN as specified in 3GPP TS 33.402 for 3GPP defined trusted WLAN, the UE shall be authenticated via an Extended Authentication Protocol, EAP authentication exchanged between the UE and the Authorization, Authentication and Accounting, AAA, server through the WLAN Access Point, AP. The authentication results in generating key for MAC level security protection between the UE and the WLAN AP. Access and authentication procedure to a trusted WLAN or 3GPP-defined trusted WLAN using EAP-Authentication Key Agreement prime, AKA', specified in Internet Engineering Task Force, IETF, Request For Comment RFC 5448 is described in clause 6.2 of 3GPP TS 33.402.

Public or private WLAN deployed in cafes, airport, hotels, etc. are typically owned by WLAN providers and that have no roaming agreements or no service level agreements with the user's mobile operator, and are therefore treated as untrusted WLAN. When a user wishes to access his/her mobile operator services using the untrusted WLAN, the user's UE uses the 3GPP SWu interface to establish an Internet Protocol security, IPSec, tunnel to an evolved Packet Data Gateway, ePDG acting as a security gateway to the the EPC. The ePDG tunnels traffic to and from the UE over the established IPSec tunnel on the Swu interface. The traffic received from the UE is further tunneled to a packet data gateway, PGW, in the EPC over the S2b interface as specified in 3GPP TS 23.402, and traffic received from the PGW over the S2b interface is forwarded to the UE over the IPSec tunnel on the SWu interface.

To establish the IPSec tunnel over the untrusted WLAN, the UE initiates the Internet Key Exchange version 2, IKEv2 protocol, specified in IETF RFC 5996. FIG. 1 (Prior art) illustrates a sequence diagram for authenticating and establishing the IPSec tunnel to connect to the EPC over an untrusted WLAN as specified in current versions of 3GPP TS 23.402 and 3GPP TS 33.402 section 8.2.2 "Tunnel full authentication and authorization".

The UE 100 initiates IKE_SA_INIT and IKE_AUTH exchanges with the ePDG 101. These initial exchanges generally consist of four messages (IKE_SA_INIT Request/Response and IKE_AUTH Request/Response). The first pair of messages (IKE_SA_INIT) negotiate cryptographic algorithms, exchange nonces, and do a Diffie-Hellman exchange and the second pair of messages (IKE_AUTH) authenticate the previous IKE_SA_INIT messages, exchange identities and certificates, and establish the first IPsec SA. The second pair is protected with the keys based on the Diffie-Hellman exchange.

At step 1, the UE and the ePDG exchange the first pair of IKE_SA_INIT messages in which the ePDG and UE negotiate cryptographic algorithms, exchange nonces and perform a Diffie_Hellman exchange.

At step 2, the UE sends the user identity (in the IDi payload) and the APN information (in the IDr payload) in this first message of the IKE_AUTH phase, and begins negotiation of child security associations. The UE omits the AUTH parameter in order to indicate to the ePDG that it wants to use EAP over IKEv2. EAP-Authentication Key Agreement, AKA as specified in IETF RFC 4187 or EAP-AKA' specified in IETF RFC 5448 are example of EAP methods specified in 3GPP and used herein (other EAP methods are possible as well). The user identity shall be compliant with Network Access Identifier (NAI) format specified in 3GPP TS 23.003, containing the IMSI or the pseudonym, as defined for EAP-AKA in IETF RFC 4187. The UE shall send the configuration payload (CFG_REQUEST) within the IKE_AUTH request message to obtain an IPv4 and/or IPV6 home IP Address and/or a Home Agent Address.

At step 3, the ePDG sends the Authentication and Authorization Request message to the AAA Server, containing the user identity and APN. The UE shall use the user identity NAI, the 3GPP AAA server shall identify based on the realm part of the NAI that combined authentication and authorization is being performed for tunnel establishment with an ePDG which allows only EAP-AKA.

At step 4, the AAA Server may fetch the authentication vectors (if these parameters are not available in the AAA Server). The AAA Server shall lookup the IMSI of the authenticated user based on the received user identity (root NAI or pseudonym) and include the EAP-AKA as requested authentication method in the request to fetch the authentication vectors from an external database.

At step 5, the AAA Server initiates the authentication challenge. The user identity is not requested again.

At step 6, the ePDG responds with its identity, a certificate, calculates the authentication code (AUTH) and sends the AUTH parameter to protect the previous message it sent to the UE (in the IKE_SA_INIT exchange). The EAP message received from the AAA Server (EAP-Request/ AKA-Challenge) is included in order to start the EAP procedure over IKEv2.

At step 7, the UE checks the authentication parameters and responds to the authentication challenge. The IKE_ AUTH request message includes the EAP message (EAP-Response/AKA-Challenge) containing UE's response to the authentication challenge.

At step 8, the ePDG forwards the EAP-Response/AKA-Challenge message to the AAA Server. At step 8a, the AAA checks, if the authentication response is correct.

Optionally at steps 8b to step 8e, if dynamic IP mobility selection is executed embedded to the authentication and authorization, the selected mobility mode is sent to the user in an AKA-Notification request, over Diameter A&A answer and IKE_AUTH message. The UE responds to this over IKEv2 and the ePDG forwards the response to the AAA Server.

At step 9, when all checks are successful including user authorization profile, the AAA Server sends the final Authentication and Authorization Answer (with a result code indicating success) including the relevant service authorization information, an EAP success and the key material to the ePDG. This key material shall consist of the Master Session Key, MSK, generated during the authentication process.

At step 10, the MSK shall be used by the ePDG to generate the AUTH parameters in order to authenticate the IKE_SA_INIT phase messages. These two first messages had not been authenticated before as there was no key material available yet. According to RFC 5996 [30], the shared secret generated in an EAP exchange (the MSK), when used over IKEv2, shall be used to generated the AUTH parameters.

At step 11, the EAP Success/Failure message is forwarded to the UE over IKEv2 and at step 12, the UE shall take its own copy of the MSK as input to generate the AUTH parameter to authenticate the first IKE_SA_INIT message. The AUTH parameter is sent to the ePDG.

At step 13, the ePDG checks the correctness of the AUTH received from the UE. At this point the UE is authenticated. The ePDG can start establishing a connection with a packet data gateway. At step 14, the ePDG calculates the AUTH parameter which authenticates the second IKE_SA_INIT message. The ePDG shall send the assigned Remote IP address in the configuration payload (CFG_REPLY). Finally, at step 15, the AUTH parameter is sent to the UE together with the configuration payload, security associations and the rest of the IKEv2 parameters and the IKEv2 negotiation terminates and the first IPSec SA/tunnel and corresponding PDN connection are now established.

Next or Fifth Generation Core Network, NGCN or 5GCN:

3GPP has finalized a Study on a new core network architecture for Next Generation System (3GPP Technical Report, TR 23.799). Currently 3GPP is finalizing the corresponding normative specifications in 3GPP Technical specification, TS 23.501 and 3GPP TS 23.502. The new core network architecture, also referred to as Next Generation Core network, NGCN or Fifth Generation Core Network, 5GCN, can be based on an evolution of the current Evolved Packet Core network, EPC, or based on a "clean slate" approach. 5GCN will be used henceforth to refer to the new core architecture. 5GCN must support various access networks including but not limited to:

The new radio access network, New RAN (also known as G-UTRAN or NextGen RAN or NG RAN), that supports the Evolved Long Term Evolution, eLTE eNBs and/or the new radio access network technology, NR (also known as G-UTRA) base stations, BS, also referred to as 5G NodeB, 5G NB, or gNB, and/or, other non-3GPP access network such as Wireless Local Area Network, WLAN.

FIG. 2 (prior art) illustrates one example of an 5GCN functional architecture currently in discussion in 3GPP that supports non-3GPP access network.

FIG. 2 (prior art) introduces a Non-3GPP Packet Data Gateway, ngPDG, that is referred to as N3IWF in 3GPP TS 23.501, as a further evolution of the ePDG in the EPC that is described in 3GPP TS 23.402. However, N3IWF provides access to 5GCN and has additional features in line with the new principles and requirements of the 5GCN. ngPDG and N3IWF are used interchangeably in this disclosure, however N3IWF will be used henceforth. The N3IWF supports:

a control plane, CP, component for the establishment of a secure tunnel between the UE and the N3IWF (e.g. via Internet Key Exchange version 2, IKEv2, defined by the Internet Engineering Task Force, IETF, RFC 5996), interfaced to the CN CP functions in the 5GCN using NG2 interface. The N3IWF uses a set of NG2 capabilities to support the EAP authentication and the NG1 Non Access Stratum, NAS, signalling between the UE and the CN CP functions.

a user plane component, implementing the termination of an Internet Protocol Security, IPSec, secure tunnel between the UE and the N3IWF to provide secure access to the 5GCN over the untrusted non-3GPP access to the UE. The N3IWF interfaces with the u-plane functions in the CN over NG3 interface.

the interface between the UE and the CN CP functions, mainly Access and Mobility Function, AMF, in 5GCN, is NG1. NG1 is transported transparently between the UE and the CN CP functions, using IP transport between the UE and the N3IWF, and NG2 between the N3IWF and the CN CP functions.

After obtaining IP connectivity over the untrusted non-3GPP access, the UE discovers the N3IWF with a mechanism that may be similar to the ePDG discovery in the EPC as described in 3GPP TS 23.402. The UE performs an attach to the 5GCN in two steps:

The UE obtains an IP address from the Non-3GPP access.

The UE establishes an IPSec tunnel with the N3IWF over NGu using similar procedure defined for the ePDG in EPC as per 3GPP 23.402 (see above). As part of establishing the IPSec tunnel, the N3IWF interacts with the CN CP functions to authenticate the UE. EAP signalling is transported between the N3IWF and the CN CP functions via NG2 interface. EAP-Authentication Key Agreement, AKA or AKA' are example of EAP methods specified in 3GPP. The IPSec tunnel established at this step is needed to protect subsequent NG1 signalling between the UE and the CN CP functions, more specifically an AMF in 5GCN.

Once the tunnel is established, and the UE is therefore authenticated, the UE sends NAS signalling containing a NAS Attach Request.

To support non-3GPP access, the following reference points illustrated in FIG. 1 (prior art) are used:

Y1: Reference point between the UE and the non-3GPP access (e.g. Wireless Fidelity, WiFi).

Y2: Reference point between the untrusted non-3GPP access and the N3IWF for the transport of UE user plane and the transport on NGu.

NGu: NGu represents interface between the UE and the N3IWF for establishing a secure tunnel between the UE and the CN, similar to the interface between the UE and the ePDG, and for securing the control plane and user plane exchanged between the UE and the CN.

NG2: NG2 represents the interface between the N3IWF and the CP functions. In the case of N3IWF, the NG2 functions used include transporting signalling between the UE and the CP Functions for UE authentication and secure tunnel establishment, transporting NG1 NAS signalling, enabling the CN CP functions to configure the N3IWF (e.g. at PDU session establishment). NG2 interface is also used to interface with the CP functions with the New RAN.

NG3: represents the user plane interface between the N3IWF and the UP functions. NG3 interface is also used to interface the UP functions with the New RAN.

5GCN is also expected to support trusted WLAN access where the UE can access the 5GCN without having to establish an IPSec tunnel and where authentication of the UE is provided by the trusted WLAN. Whether the UE is using trusted WLAN or untrusted WLAN to connect to an EPC or an 5GCN, there is a risk that the user identity privacy be compromised. For example, in trusted WLAN, while the EAP authentication method is widely used in public WLAN access environment using IEEE 802.1x, the EAP authentication is implemented prior to the MAC level security protection between the UE and the WLAN Access Point, AP and before the master session key is generated. Consequently, the user identity when present can be revealed in public WLAN access environment and therefore may be acquired by a rogue AP.

In untrusted WLAN, the UE will provide its user identity in the encrypted IKE_AUTH request message before verifying the trust relationship with its IKE peer, this may cause a man in the middle acquiring the user identity.

SUMMARY

The present disclosure describes methods and apparatus for supporting user identity privacy protection, IPP, in the public access environment, typically, in the public WLAN access.

Identity privacy may be an issue in either the 3GPP defined trusted or untrusted WLAN connected to either an EPC or an 5GCN (5G Core network). This is because when the UE initiates establishment of a secure communication, there is a risk that the user identity be highjacked by a rogue AP or gateway. This causes a major security concern.

First, in the 3GPP-defined trusted WLAN, EAP is implemented prior to MAC level security protection between the UE and the WLAN AP and before the master key is generated. The EAP authentication is implemented without signaling protection. Thus, user identity is revealed in public WLAN access environment. If the UE associates to a rogue AP, the UE can thus provide its real identity (e.g., International Mobile Station Identity, IMSI).

Second, in the 3GPP-defined untrusted WLAN architecture, the IPSec tunnel provides end-to-end IP level security protection, however a rogue ePDG or N3IWF may get access to the real user identity. This is because, according to 3GPP TS 33.402, the UE may perform Diffie-Hellman with a Rogue IKE peer, such as a rogue ePDG or a rogue N3IWF. The Diffie-Helman being performed in the IKE-INIT exchange, after which the UE could then provide its user identity to the rogue IKE peer in the encrypted IKE_AUTH request message before the UE verifies the trust relationship with that rogue IKE peer. Consequently, user privacy may be a potential issue the current 3GPP specification.

One embodiment presented herein describes a UE attempting to attach and establish a secure communication to a network (e.g., EPC, 5GCN, etc.) through an immediate gateway over a public WLAN access (for example, an ePDG or N3IWF or a wireless access gateway or an AP or the like). However, prior to establishment of the "server" trust, the UE supporting IPP provides in an access or authentication request to the immediate gateway an anonymous user identity rather than the real user identity. Upon receiving user's access or authentication request (e.g., EAP request or IKE_AUTH request) with an anonymous user identity, the immediate gateway, if it supports IPP, provides its certificate to the UE to establish the "server" trust. The anonymized user identity is used at least for as long as the "server" trust has not been established by the UE. If the immediate gateway does not support IPP and/or does not provide a certificate, it must pass the anonymized identity to the backend trusted server or authentication sever (e.g., AAA), which then provides its certificate for the client through the immediate gateway. The UE uses the server certificate to authenticate the authentication server and obfuscate the user's real identity over the public unsecure WLAN access network. Note that "server" in ""server" trust" refers to the entity responsible for providing to the UE a secure communication and access to the Core network over the public WLAN, and may be an ePDG, an N3IWF, a wireless access gateway, an AP or an authentication server such as a AAA server.

In accordance with one aspect, a method at the UE attempting to establish a secure communication over a trusted or untrusted WLAN and for providing user identity privacy is provided. The method comprises sending a message comprising an anonymous user identity where the message may be an IKE_AUTH request message if untrusted WLAN is used or an EAP response/identity message if trusted WLAN is used. The method further comprises receiving in response to the message a request for obfuscating the user identity wherein the request comprises a server certificate. The request may be an EAP attribute included in an EAP request/AKA identity or AKA' identity. The UE then proceeds with validating the server certificate and sending a response message comprising the user identity obfuscated by a public key associated with the server certificate.

In accordance with another aspect, a wireless device or UE is provided where it is adapted to send a message comprising an anonymous user identity where the message may be an IKE_AUTH request message if untrusted WLAN is used or an EAP response/identity message if trusted WLAN is used. The method further comprises receiving in response to the message a server certificate and an authentication code generated by the server. The UE then proceeds with validating the server certificate and the authentication code and send a response message comprising the user identity. The UE may in this case receive an instruction to obfuscate the user identity, in which case the UE encrypts the user identity with the server's public key when sending the response message back to the server.

In one aspect, the UE validates the server certificate by verifying that the server certificate belongs to a trusted Certificate Authority, CA, list and that it contains at least one of an operator of the wireless device or one or more partner operators of the wireless device.

In another aspect, the wireless device or the UE validates the server by calculating its own authentication code and determine that its own generated authentication code matches the authentication code generated by the server and received in the response message.

In accordance with another aspect a method at a server (e.g., AAA server) in the network is provided, where the method comprises receiving at the server an Authentication and Authorization, AA, request message or Diameter EAP request, DER, message for authorizing and authenticating a wireless device or UE, wherein the AA request message/DER message comprises an anonymous user identity sent from the wireless device or UE. The anonymous user identity is provided in the user name attribute and in the EAP response/identity message included in the AA request message/DER message. The method then provides for sending an instruction for the UE to request obfuscation of the user identity, wherein the instruction further comprises a certificate for the server; and upon receiving the user identity encrypted by the public key associated with the server certificate, the server decrypts the user identity using the corresponding private key and proceed with authenticating the wireless device in accordance with the procedure shown in FIG. 1 (prior art) steps 4-15 or the procedure shown in 3GPP TS 33.402, clause 6.2, from step 10a to step 24.

In accordance with another aspect a method in a gateway (e.g., ePDG, N3IWF and even a PWAN or TWAG) for enabling privacy protection of a user identity when a wireless device establishes a connection to the network over a non-third generation partnership project, non-3GPP, access network is provided. The ePDG or N3IWF provide access for a wireless device to a core network over untrusted non 3GPP access. A PWAN or TWAG provide access for a wireless device to a core network over trusted non 3GPP access. The method comprises receiving at the gateway from the wireless device a message comprising an anonymous user identity; in response to determining that privacy protection is provided by the gateway, the gateway proceeds with sending a response message comprising a public certificate of the gateway and an authentication code generated by the gateway. If instead in response to determining that privacy protection is provided by a server entity, if the gateway does not support privacy protection of the user identity, the gateway proceeds with forwarding to the server entity the received message comprising the anonymous user identity.

In another aspect, a wireless device is provided with one or more modules, where the one or more modules performs any of the embodiments herein.

In another aspect, a wireless device/UE comprises at least one transceiver; at least one processor; and memory comprising instructions executable by the at least one processor whereby the wireless device/UE is operable to perform any of the embodiments provided herein.

In yet another aspect, a gateway (ePDG, N3IWF (a.k.a. ngPDG) or PWAN, etc.) comprises at least one processor and memory comprising instructions executable by the at least one processor whereby the gateway is operable to perform any of the gateway embodiments provided herein.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

The accompanying drawing figures incorporated in and forming a part of this specification illustrate several aspects of the disclosure, and together with the description serves to explain the principles of the disclosure.

DETAILED DESCRIPTION

Figure 1:
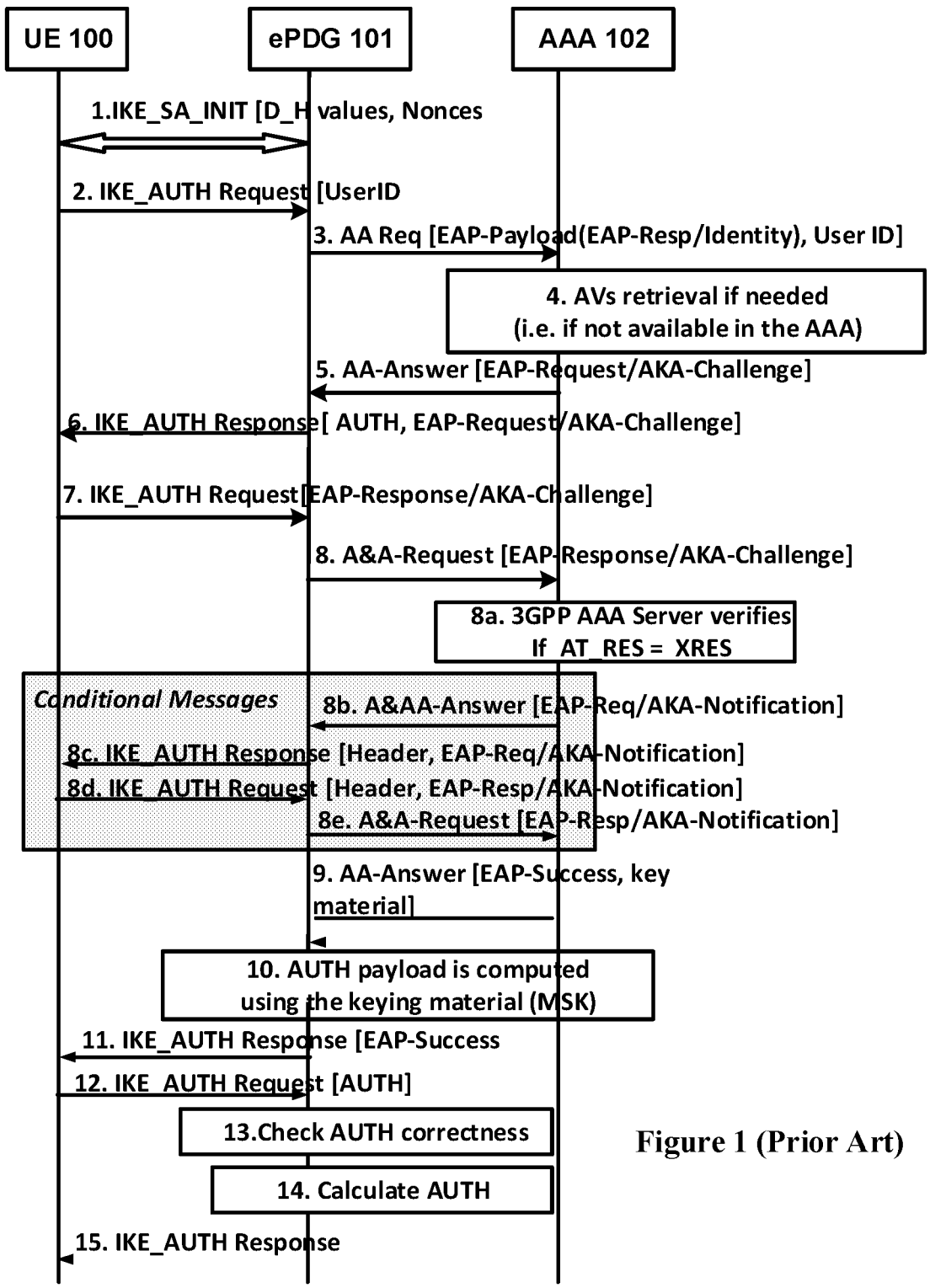
FIG. 1 (prior art) illustrates an IKE exchange over untrusted WLAN for establishment of an IPsec SA or tunnel.
Figure 2:
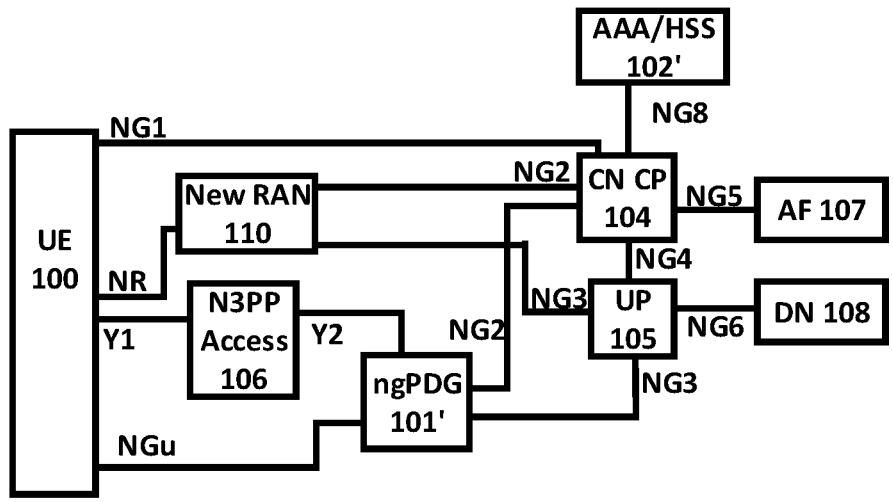
FIG. 2 (prior art) illustrates a 3GPP architecture example for supporting Non 3GPP, N3PP, access such as WLAN access using N3IWF.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

ACRONYMS AND DEFINITIONS

The following acronyms and definitions are used throughout this disclosure.
  3GPP Third Generation Partnership Project
  5G Fifth Generation
  AF Application Function
  AKA Authentication Key Agreement
  AVP Attribute Value Pair
  CPU Central Processing Unit
  CN Core Network
  CP Control plane
  DEA Diameter EAP Answer
  DER Diameter EAP Request
  DN Data Network
  EAP Extensible Authentication Protocol
  ESP Encapsulating Security Payload
  ePDG Evolved Packet Data Gateway
  EUTRAN Evolved Universal Terrestrial Radio Access Network
  FPGA Field Programmable Gate Array
  gNB next generation NodeB
  IEEE Institute of Electrical and Electronics Engineers
  IETF Internet Engineering Task Force
  IKE Internet Key Exchange Protocol (any version)
  IoT Internet of Things
  IPP Identity privacy protection
  IPSec Internet Protocol Security
  LTE Long Term Evolution
  MAC Medium Access Control
  MSK Master Session Key
  N3PP Non-3GPP Access
  NG Next Generation
  N3IWF Next Generation Packet Data gateway
  NR New Radio
  5GCN Next Generation Core network
  PDU Packet Data User plane/Unit
  PWAN Public WLAN Access Network
  RAN Radio Access Network
  RAT Radio Access Technology
  SA Security Association
  SD Subscriber Database
  SPI Security Parameter Index
  UE User Equipment
  UP User Plane
  USB Universal Serial Bus
  VPN Virtual Private Network
  WEP Wired Equivalent Privacy
  WiFi Wireless Fidelity
  WLAN Wireless Local Area Network
  WPA WiFi Protected Access Trusted WLAN: public WLAN that supports IEEE 802.1x and EAP authentication. A 3GPP defined trusted WLAN is a public WLAN trusted by a 3GPP operators network (e.g., EPC, 5GCN, etc.), where the UE access is authenticated via WLAN access and does not require an additional authentication to access the 3GPP operator's network (e.g., EPC or 5GCN) and services. In this document, trusted WLAN and 3GPP-defined trusted WLAN are used interchangeably.

Untrusted WLAN: public WLAN that is not trusted by a 3GPP operators network (e.g., EPC, 5GCN, etc.), and where the UE is required to establish a VPN (e.g., IPSec VPN) over the public WLAN with a gateway (e.g., ePDG or N3IWF) that provides access to the 3GPP operators network (e.g., EPC or 5GCN) and services. In this document, untrusted WLAN and 3GPP-defined untrusted WLAN are used interchangeably.

In the present disclosure, a UE is a non-limiting term that refers to any type of wireless device, WD, communicating over WiFi with a radio access node such as a WiFi Access point, AP and may also communicate with other radio access nodes such as eLTE eNB, LTE eNB, 5G/NR gNB over cellular or 3GPP radio interfaces such as LTE or NR or the like. The UE can also communicate with security gateways over NGu or SWu to establish a VPN tunnel (e.g., IPSec tunnel) to access operators core network (EPC or 5GCN). The UE may also support other network interfaces (e.g., non-access stratum, NAS, or NG1) to communicate with network nodes in the 5GCN or EPC, such as Control Plane, CP, entities in 5GCN or Packet gateways, PGWs in EPC. The UE may also communicate with another UE in a cellular or mobile communication system and may act as a gateway or relay for other devices, mainly low powered Internet of things, IoT, devices. Examples of a UE comprise a Personal Digital Assistant (PDA), a tablet, mobile terminals, a smart phone, a Laptop Embedded Equipment (LEE), a Laptop Mounted Equipment (LME), Universal Serial Bus (USB) dongles, etc.

Additionally, a gateway is also a non-limiting term and refers to either a gateway that supports untrusted WLAN and provides UE access to operators CN (5GCN or EPC) over an untrusted WLAN or a gateway that supports trusted WLAN that provides UE access to operator's CN (5GCN or EPC) over a trusted WLAN. A gateway that supports untrusted WLAN access may be a 3GPP ePDG described in 3GPP TS 23.402 or an N3IWF introduced in 3GPP TR 23.799 and 3GPP TS 23.501. Both ePDG and N3IWF are used as security gateways and the UE accesses the operators network by dynamically establishing an IPsec tunnel with the security gateway using Internet Key exchange, IKE, protocol.

A gateway that supports trusted WLAN access may be a 3GPP trusted wireless access gateway, TWAG, as described in 3GPP TS 23.402. The gateway supporting trusted WLAN supports UE access to the operators network after UE performs EAP authentication in the WLAN using IEEE 802.1x.

In the 3GPP-defined untrusted WLAN access, an ePDG 101 or an N3IWF 101' or any security gateway supporting IKE(v2) and IPsec may be used to provide for the UE IPSec VPN service and access to operator's core network (EPC or 5GCN) over untrusted WLAN or untrusted Non 3GPP access network. The embodiments herein pertained to untrusted WLAN are described using the ePDG 101 for accessing EPC as an example. However, it is understood that the embodiments can equally be described using an N3IWF 101' for accessing 5GCN or a security gateway that support IKE and IPSec.

In the description herein, reference may be made to the term "cell;" however, particularly with respect to 5G concepts, beams may be used instead of cells and, as such, it is important to note that the concepts described herein are equally applicable to both cells and beams.

Scenarios Supporting IPP Over Untrusted WLAN Access.

The ePDG 101 acts as the security gateway that communicates with the UE 100 over the SWu interface. The AAA server 102 acts as backend trusted server. The ePDG 101 may or may not support IPP as proposed in this document, however, at least one of the ePDG 101 and the AAA server 102 supports IPP.

The UE 100 supporting IPP as described in this embodiment, provides an anonymous user identity to the ePDG 101 in the first IKE_AUTH request message.

Scenario 1: ePDG Supports IPP:

If the ePDG 101 supports the IPP feature, it will initiate the request of the real user identity through the IKE_AUTH response message without triggering user authentication procedure towards the AAA server 102. The ePDG 101 provides in the IKE_AUTH response message its certificate. The UE 100 authenticates the ePDG 101 based on the ePDG certificate and if the ePDG certificate is validated by the UE 100, the UE 100 will then provide the user's real identity to the ePDG 100 in a subsequent IKE_AUTH request message.

Figure 3:
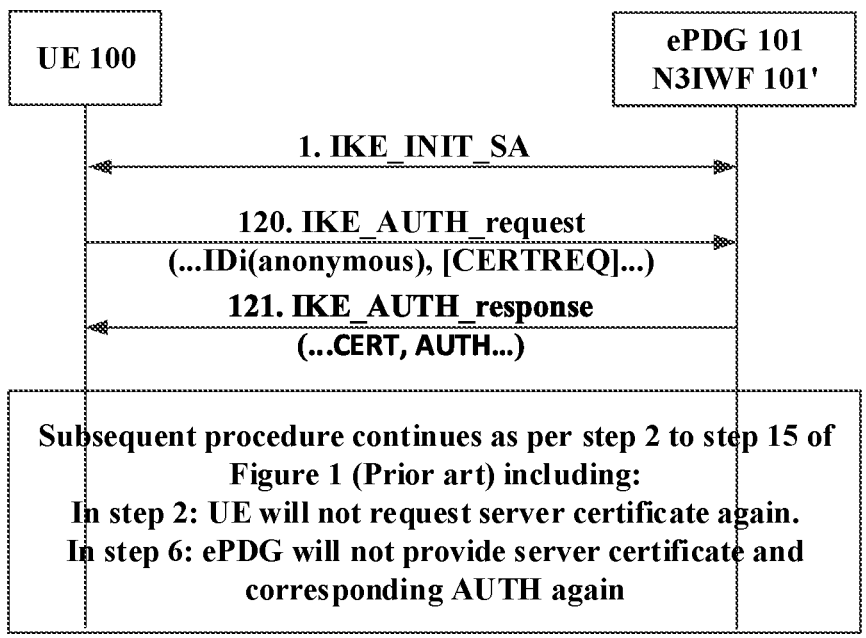
FIG. 3 illustrates IKE exchange for supporting IPP over untrusted WLAN when the ePDG supports IPP, according to one embodiment.

In this regard, FIG. 3 illustrates an embodiment of the IKE exchange between the UE 100 and the ePDG 101 over the untrusted WLAN, and where the UE 100 and the ePDG 101 support IPP. Step 1 of FIG. 3 is the same as step 1 of FIG. 1 (prior art) consisting of IKE_INIT_SA message exchange between the UE 100 and the ePDG 101 for establishing an IKE SA and an IPSec SA. The subsequent steps 120 and 121 are additional steps to the IKE exchange illustrated in FIG. 1 (prior art). Following the IKE_INIT_SA exchange, the UE 100, at step 120, which supports IPP sends to the ePDG 101 the first IKE_AUTH request message in which is provided an anonymous user identity in the IDi payload. The UE may also provide a CERTREQ payload in the same message to request the ePDG certificate.

Format of User Identity

Examples of the user identity format included in the IDi payload is as follows:

"0<identity>@nai.epc.mnc<MNC>.mcc<MCC>.

3gppnetwork.org" for EAP AKA authentication.

For anonymous user identity, the identity string indicates "anonymous"

Back to FIG. 3, and at step 121, the ePDG 101 supporting IPP, receives the anonymous user identity. The ePDG 101 does not start the authentication procedure towards the AAA server 102. Instead, at step 121, the ePDG 101 responds to the UE 100 by sending an IKE_AUTH response message to the UE 100, where the ePDG 101 provides for the UE 100 its certificate in the CERT payload and the corresponding AUTH payload.

When the UE 100 receives the IKE_AUTH response message at step 121, the UE 100 will verify the received certificate. If it belongs to the UE's trusted CA list and it contains UE's operator or partner operators, the UE 100 will accept the received certificate, and will therefore trust the ePDG 101. In this case, the UE 100 will further validate the received AUTH according to IKEv2 protocol.

Following successful verification of the ePDG certificate, validation of the received AUTH, and determination by the UE 100 that it can trust the ePDG 101, the UE 100 proceeds with performing and completing the authentication and establishing the IKE SA and IPSec SA as described in step 2 to step 15 of FIG. 1 (Prior art) where at step 2, the UE 100 sends to the ePDG 101 another IKE_AUTH Request message, this time, containing the real user identity (in the IDi payload) and the UE 100 does not request the server certificate again. Subsequently, when executing step 6 of FIG. 1 (Prior art) the ePDG 101 does not provide its certificate and may not provide a corresponding AUTH value again.

Alternatively, if at step 121, the UE 100 determines that the certificate is not valid, because the certificate does not belong to the UE's trusted CA list or belongs to UE's trusted CA but it does not contain UE's operator or partner operators, the UE 100 therefore fails to verify the received CERT and treats the ePDG 101 as untrusted gateway. Consequently, the UE 100 may abort the authentication and connection request and does not proceed with providing the real user identity to gateway as it determines that the gateway is untrusted.

Additionally, if the UE 100 generated AUTH value does not match the AUTH value received in the IKE_AUTH response at step 121, the UE may determine that the ePDG 101 cannot be trusted either and may abort the connection with the ePDG 101.

Scenario 2: AAA Server Supports IPP:

In this scenario, the ePDG 101 does not support the IPP feature, but the AAA server 102 does. The AAA server 102 may have previously indicated to the ePDG 101 that it supports IPP during for example a feature capability exchange or the ePDG 101 may simply be configured to communicate with the AAA server 102 when receiving an anonymous identity. In this embodiment, upon receiving from the UE 100 an IKE_AUTH request message containing anonymous identity, the ePDG 101 will trigger user authentication towards the AAA server 102. The ePDG 101 sends to the AAA server 102 a DIAMETER EAP Request, DER, message and includes the anonymous user identity as provided by the UE 100.

The AAA server 102 will initiate the request of the user's real identity through an EAP identity/request message payload. In the EAP identity/request message, the AAA server 102 will provide its certificate to the UE 100. Once the UE 100 validates the certificate of the AAA server 102, the UE 100 will obfuscate its real user identity by encrypting it using the public key provided with the AAA server certificate. The UE 100 provides the obfuscated user identity to the AAA server 102 using the EAP identity/response message.

Figure 4:
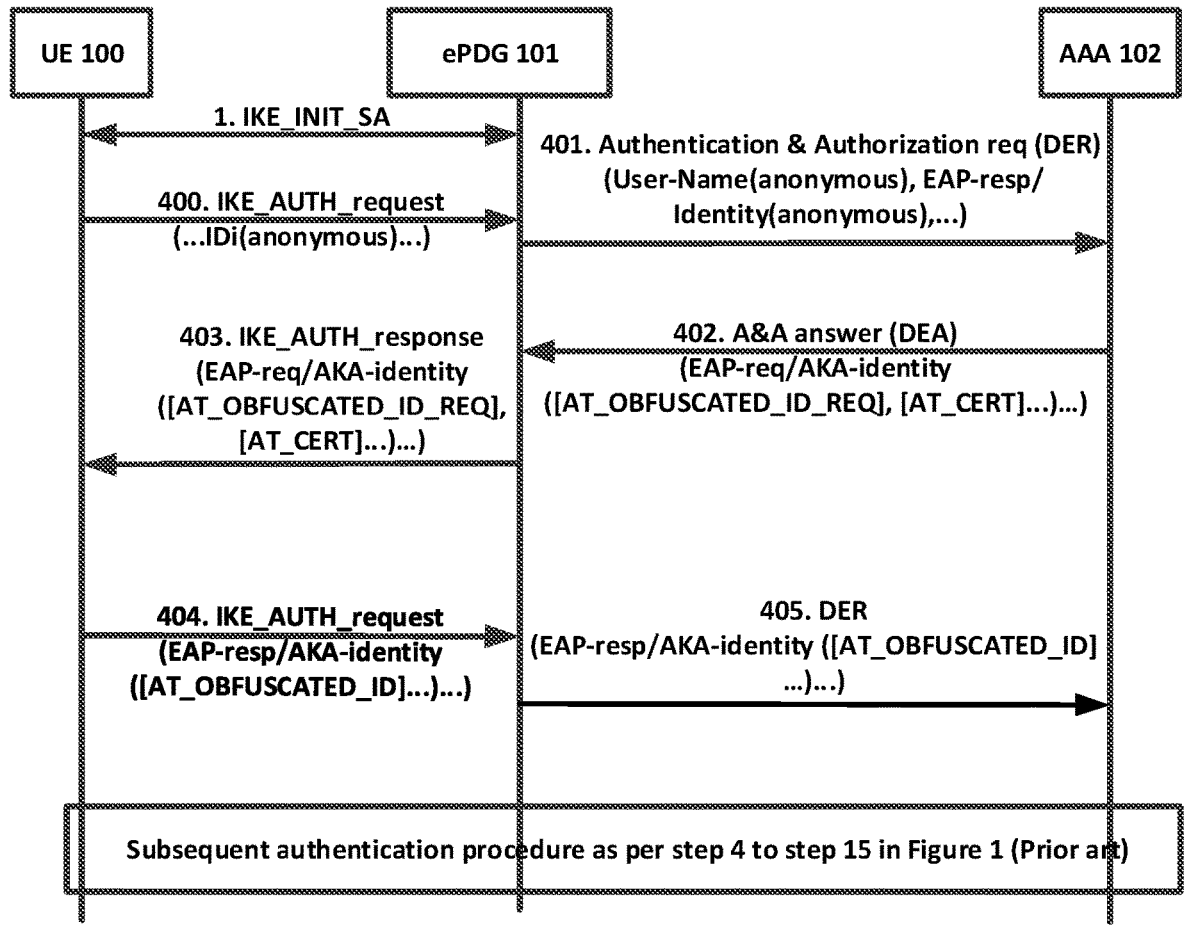
FIG. 4 illustrates IKE exchange for supporting IPP over untrusted WLAN when the ePDG does not support IPP, according to one embodiment.

In this regard, FIG. 4 is provided illustrating the embodiment of an IKE exchange with IPP between the UE 100, the ePDG 101 and the AAA server 102 over the untrusted WLAN, and where the ePDG 101 does not support IPP but the AAA server 102 supports IPP. At step 1, the UE 100 initiates IKE exchange for establishing an IKE SA and an IPSec SA. The IKE exchange at step 1 of FIG. 4 consisting of IKE_INIT_SA message exchange is the same as step 1 of FIG. 1 (prior art). Steps 400 to 403 are additional steps to the existing IKE exchange in support of IPP in accordance with this embodiment. Further, steps 404 and 405 correspond to modified steps 2 and 3 of FIG. 1 (prior art).

Detailed step by step description of embodiment illustrated by FIG. 4 is now provided. At step 400, the UE 100 supporting IPP will provide an anonymous user identity in the IDi payload in the first IKE_AUTH request message to the ePDG 101. The UE 100 may include CERTREQ payload in the message to request ePDG certificate or AAA certificate (in other words, a certificate validating the identity of the network entity granting it access to the Core network, EPC).

In this embodiment, the ePDG 101 does not support IPP or supports IPP and will not provide its certificate to the UE 100. Upon receiving the IKE_AUTH_Request at step 400, the ePDG 101 will determine that it should treat the anonymous identity as an ordinary user identity and at step 401 starts the user authentication procedure towards the AAA server 102 through SWm interface as defined in 3GPP TS 29.273.

At step 401, the ePDG 101 sends a DER message to the AAA server 102, where the DER message comprises the anonymous user identity in the User-Name AVP of the DER message, and may include the anonymous user identity in the EAP-response/Identity attribute.

Format of Anonymous User Identity in DER Message

Examples of the user identity format included in the DER message are as follows:

"0<identity>@nai.epc.mnc<MNC>.mcc<MCC>. 3gppnetwork.org" for EAP AKA authentication For anonymous user identity, the identity is string "anonymous"

Figure 10A:
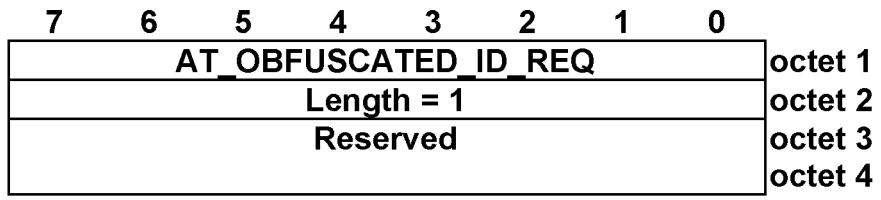
FIG. 10a and FIG. 10b and FIG. 10c illustrate example format for attributes representing a request for obfuscated identity, an obfuscated identity and the AAA server certificate according to an embodiment.
Figure 10B:
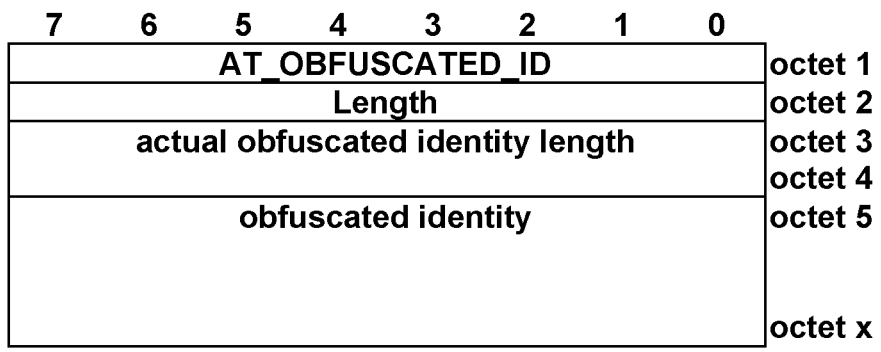
Figure 10C:
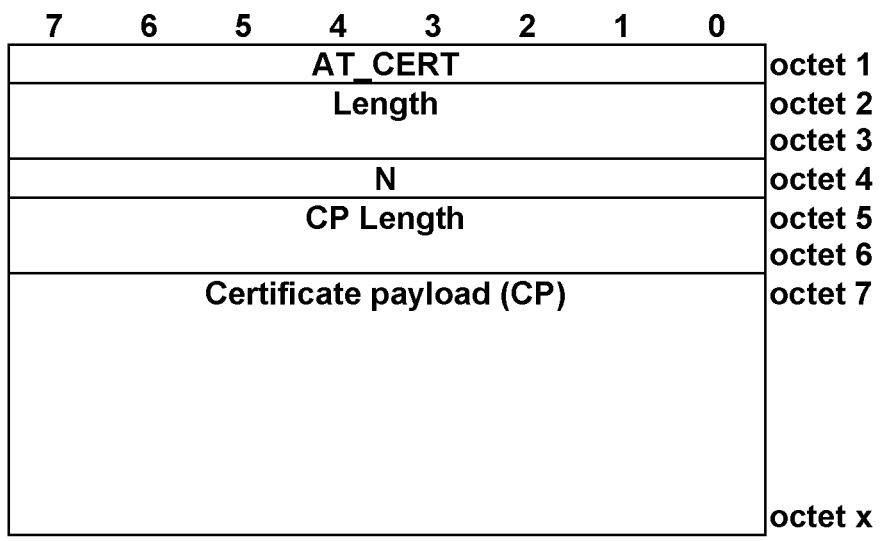

Back to FIG. 4, when the AAA server 102 supporting IPP receives the anonymous user identity, it will at step 402 sends a DEA message back to the ePDG 101 instructing or requesting the UE 100 to send an obfuscated user identity. The AAA server 102 may provide the instruction by including in the DEA message an EAP-request/AKA-identity message payload to the UE which contains an indication. The AAA server 102 includes the AAA server certificate in another AVP. An example of the indication requesting an obfuscated user identity type is an attribute which may be called AT_OBFUSCATED_ID_REQ attribute as illustrated in FIG. 10a. An example of the AAA certificate attribute AT_CERT is illustrated in FIG. 10c. When the ePDG 101 receives the DEA message of step 402 it retrieves the EAP-request/AKA-identity message and at step 403, sends it to the UE 100 using an IKE_AUTH_Response message.

When the UE 100 receives the EAP-request/AKA-identity message payload at step 403 that includes the indication that obfuscated user identity type is requested and the AAA server certificate, the UE 100 will verify the received AAA certificate. If it belongs to UE's trusted CA list and contains UE's operator or partner operators, the UE 100 will accept the received certificate. After successfully verifying the received certificate, the UE 100 determines that it should provide an obfuscated user identity as requested instead of a non-obfuscated user identity. The UE 100 at step 404 obfuscates its user identity by encrypting it with the public key of the received AAA certificate and includes it in the EAP-response/AKA-identity message payload. The EAP-response/AKA-identity message payload is included in an IKE_AUTH_Request message which is sent to the ePDG 101. FIG. 10b illustrates an example of the obfuscated user identity attribute format included in the EAP-response/AKA-identity message. The attribute is presented as the AT_OBFUSCATED_ID attribute. The ePDG 101 retrieves the EAP-response/AKA-identity message from the IKE_AUTH_Request message and forwards it at step 405 to the AAA server 102 in a DER message.

Format of Obfuscated User Identity

Example of the obfuscated user identity format is as follows:

"0<identity>@nai.epc.mnc<MNC>.mcc<MCC>. 3gppnetwork.org" for EAP AKA authentication For obfuscated user identity, the identity is the value of obfuscated IMSI value of the user. For 5G, it may be an obfuscated SUPI, Subscriber Permanent identity.

Back to FIG. 4 step 405, when the AAA server 102 receives the obfuscated user identity it decrypt the user identity (using the private key of its certificate). At this point, the AAA server 102 will make use of the user identify to implement subsequent authentication and authorization procedure as illustrated in subsequent steps 4-15 of FIG. 1 (prior art).

the subsequent procedure can be implemented according to the 3GPP standard steps 4-15 as illustrated in FIG. 1 (prior art). The user identity will be provided from AAA server 102 to the ePDG 101 in a User-Name AVP included in the last DER message corresponding to step 9 of FIG. 1 (Prior art) or at any step subsequent to successful authentication of the UE 100 by the AAA server 102

Scenarios Supporting IPP Over Trusted WLAN Access:

In public WLAN that are based on IEEE802.1x architecture, a public WLAN access network node (PWAN 101bis), which may be a WLAN AP or a WLAN gateway acts as the immediate gateway for the UE 100 and the AAA server 102 acts as backend trusted server. As stated earlier the immediate gateway is the gateway that acts as an authenticator and allows the UE 100 access to CN resources (EPC or 5GCN). When PWAN 101bis sends to the UE 100 the EAP identity/request message, the UE supporting IPP will provide anonymous user identity to PWAN 101bis in the EAP identity/response message.

The PWAN 101bis will at this point trigger the user authentication towards the AAA server 102 and sends a DER message that includes the EAP identity/response containing the anonymous user identity.

The AAA server 102 will initiate the request for an obfuscated user's real identity through an EAP identity/request message payload and in this EAP message, the AAA server 102 will provide its certificate to the UE 100.

Figure 5:
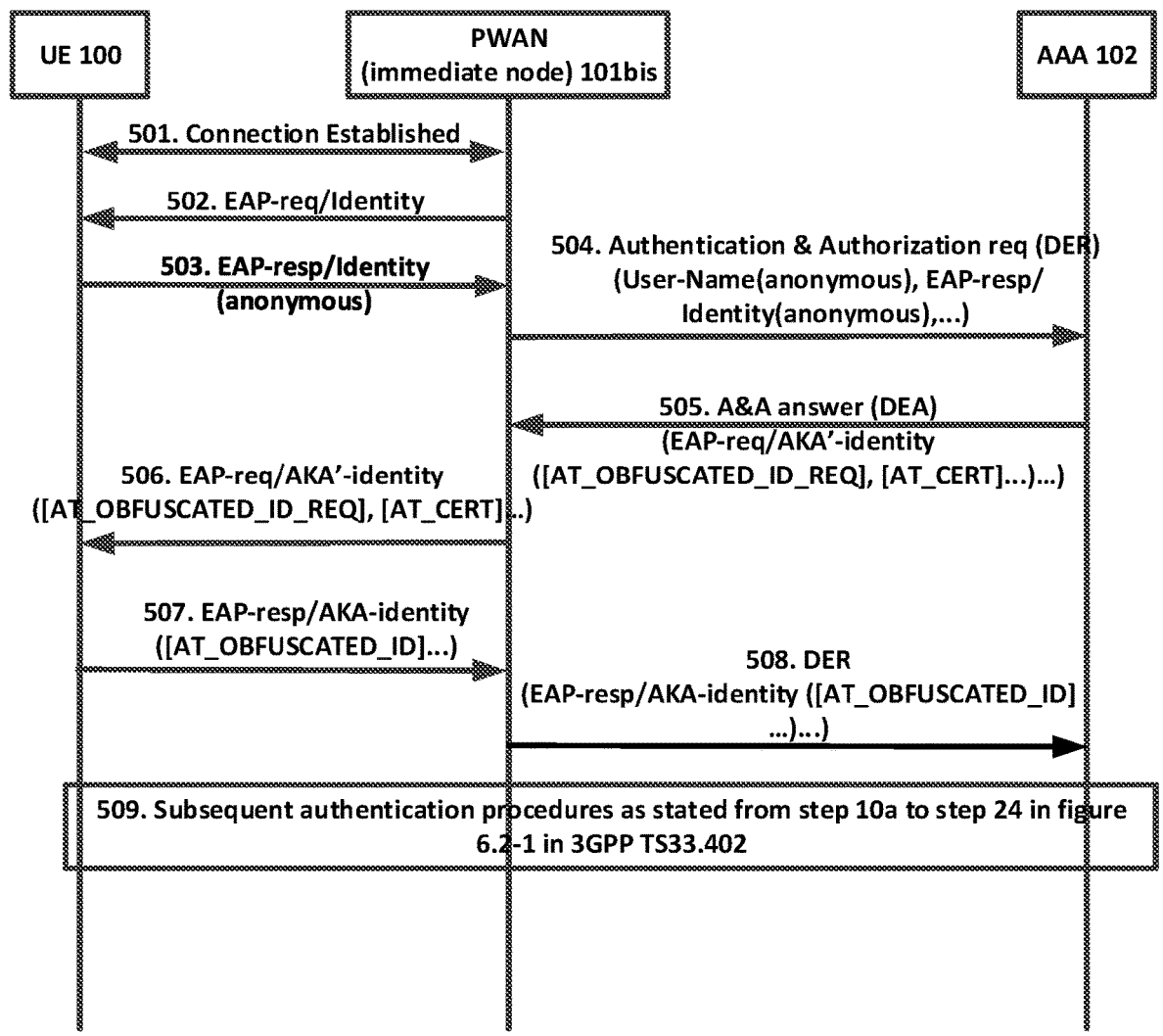
FIG. 5 illustrates EAP exchange for supporting IPP over a trusted WLAN, according to one embodiment

After the UE 100 verifies that the certificate of the AAA server 102 is valid, i.e., certificate belongs to UE's trusted CA list and contains UE's operator or partner operators, the UE 100 will accept the received certificate. The UE 100 will then obfuscate its user identity by encrypting it using the public key of the AAA certificate. The UE 100 then provides the obfuscated user identity back to the AAA server 102 through the PWAN 101bis using the EAP identity/response message In this regard, FIG. 5 illustrates an embodiment of the EAP exchange in support of IPP between the UE 100, the PWAN 101bis and the AAA server 102 over the trusted WLAN. At step 501, the UE 100 is connected to the PWAN 101bis using the WiFi connection/association procedure. At step 502, after the UE 100 has selected and connected to the PWAN 101bis, the PWAN 101bis sends an EAP-request/Identity message to the UE to request its user identity.

At step 503, the UE 100 supporting IPP will send back an EAP-response/Identity message to the PWAN 101bis and provides an anonymous user identity in the message. Examples of format of anonymous user identity is shown below.

Format of User Identity

Examples of the user identity format included in the IDi payload is as follows:

"6<identity>@nai.epc.mnc<MNC>.mcc<MCC>. 3gppnetwork.org" for EAP AKA' authentication For anonymous user identity, the identity is string "anonymous"

Back to FIG. 5, when the PWAN 101bis receives the anonymous user identity, the PWAN 101bis will treat this identity as an ordinary user identity or simply just forward the request to the AAA server 102. At this point, the PWAN 101bis starts the user authentication procedure towards the AAA server 102 through for example the STa interface defined in 3GPP TS 29.273. Note that PWAN 101bis is not required to support the IPP capability, considering the possible huge impact on plenty of existing legacy WLAN AP. Hence for the trusted WLAN, the IPP is supported by the UE 100 and the AAA server 102. However, if one ought to deploy a WLAN AP that supports IPP, similar procedure as described in FIG. 3 above would be applied.

At step 504, the PWAN 101bis sends a DER message to the AAA sever 102 and includes
  a. the anonymous user identity in the User-Name AVP and
  b. the anonymous user identity in the EAP response/identity EAP-response/Identity attribute as provided by the UE 100. Examples of format of anonymous user identity are already shown above.

When the AAA server 102 receives at step 504 the anonymous user identity, it will, at step 505, send a DEA message back to the PWAN 101bis instructing or requesting the UE 100 to send an obfuscated user identity. The AAA server 102 may provide the instruction by including in the DEA message an EAP-request/AKA'-identity message payload to the UE which contains an AVP indicating that obfuscated user identity type is requested. The EAP-request/AKA'-identity message also includes the AAA server certificate in another AVP. An example of the indication AT_OBFUSCATED_ID_REQ attribute that indicates that an obfuscated identity is requested is provided in FIG. 10a and an example of the AAA certificate attribute AT_CERT attribute value pair, AVP is illustrated in FIG. 10c. When the PWAN 101bis receives the DEA message of step 505 it retrieves the EAP-request/AKA-identity message and sends it to the UE 100 at step 506.

When the UE 100 receives the EAP-request/AKA-identity message payload at step 506, the UE will verify the received certificate. If it belongs to UE's trusted CA list and contains UE's operator or partner operators, the UE 100 will accept the received certificate. After successfully verifying the received certificate, and the UE 100 has been instructed/requested to provide obfuscated user identity, it will obfuscate the user identity by encrypting it using the public key of the received AAA certificate.

At step 507, the UE 100 responds by sending to the PWAN 101bis the EAP-response/AKA-identity message which contains the encrypted user identity in AT_OBFUSCATED_ID attribute. An example format of the AT_OBFUSCATED_ID attribute is illustrated in FIG. 10b. An example format of the obfuscated identity carried by the AT_OBFUSCATED_ID attribute is shown below:
Format of Obfuscated User Identity
  "0<identity>@nai.epc.mnc<MNC>.mcc<MCC>.
    3gppnetwork.org" for EAP AKA authentication
  For obfuscated user identity, the identity is the value of obfuscated IMSI value of the user. For 5G, the identity that is obfuscated may be the SUPI.

At step 508, the PWAN 101bis forwards the received EAP-response/AKA-identity message in a DEA message to the AAA server 102. When the AAA server 102 receives the obfuscated user identity, it will decrypt the user identity using the private key associated with its certificate and will make use of the user identify to implement subsequent authentication and authorization for the user. Step 509 represents the subsequent authentication procedure according to the 3GPP standard TS 33.402, clause 6.2 "Authentication and key agreement for trusted access" from step 10a to step 24. The user identity (As decrypted) can be provided to the PWAN 101bis by the AAA server 102 at any of steps 13a or 23a as shown in 3GPP standard TS 33.402, clause 6.2 "Authentication and key agreement for trusted access".

Figure 6:
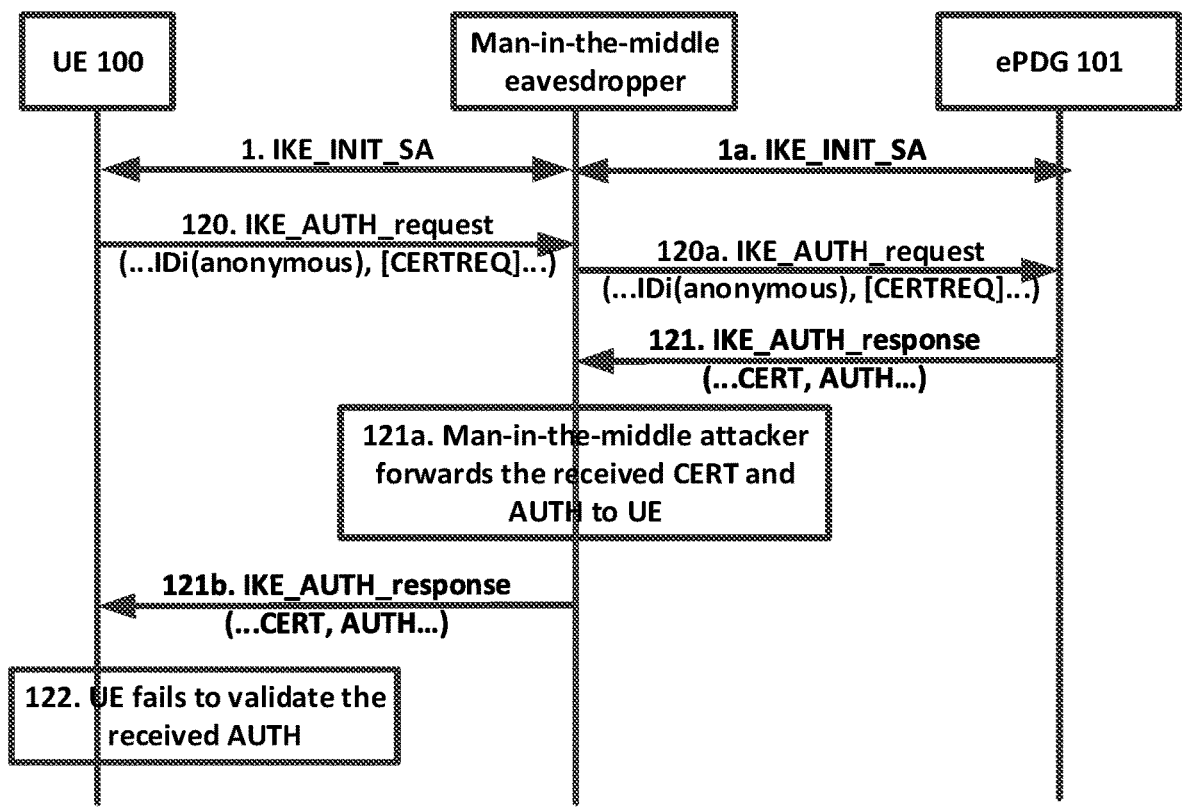
FIG. 6 illustrates impact of a Man in the Middle attack on the IKE exchange supporting IPP over untrusted WLAN, according to one embodiment.

Man-in-the Middle Attack:

FIG. 6 is an embodiment illustrating the resilience of the IPP in presence of a man in the middle eavesdropper. The embodiment is illustrated for an untrusted WLAN access based on the procedure of FIG. 3.

At step 1, the UE 100 initiates IKE exchange for establishing an IKE SA and an IPSec SA. The IKE exchange at step 1 of FIG. 6 consists of IKE_INIT_SA message exchange and is the same step as step 1 of FIG. 1 (prior art) and FIG. 3. The UE 100 is however not aware that it is performing the IKE_INIT_SA exchange with a man in the middle eavesdropper instead of a legitimate ePDG 101. Consequently, the UE 100 proceeds and performs Diffie-Helman and exchange nonces and values with the man in the middle eavesdropper. At step 1a, the man in the middle eavesdropper performs the IKE_INIT_SA exchange with the ePDG 101 attempting to behave as the UE 100. The man in the middle eavesdropper and the ePDG 101 also share the Diffie Heiman values and nonces etc. as required by the IKE_INIT_SA exchange. Steps 120 is the same as step 120 of FIG. 3. The Man in the middle eavesdropper is expected to intercept the IKE_AUTH message of step 120 of FIG. 3 and forwards it to the ePDG 101 at step 120a. Step 121 is the same as step 121 of FIG. 3 where the ePDG 101 includes a certificate [CERT] and the AUTH payload in an IKE_AUTH_response message.

At step 121a, the man-in-the-middle eavesdropper intercepts the IKE_AUTH_response message, may store the received CERT and AUTH payload and forwards the message to the UE 100 at step 121b.

At step 122, when the UE 100 receives the CERT payload from the man in the middle eavesdropper which includes the certificate of the ePDG 101 and the AUTH payload as provided by the ePDG 101. The UE 100 accepts the certificate as a valid certificate. But for the received AUTH payload, the UE calculates its AUTH based on the previous exchange in step 1, which is actually an IKE_INIT_SA exchange between the UE 100 and the man-in-the-middle eavesdropper. So the UE would fail to validate the received AUTH payload generated by the ePDG 101, as the ePDG 101 has based its AUTH calculation on the IKE_INIT exchange performed at step 1a with the man in the middle eavesdropper. If AUTH fails, the UE aborts the connection.

Figure 7:
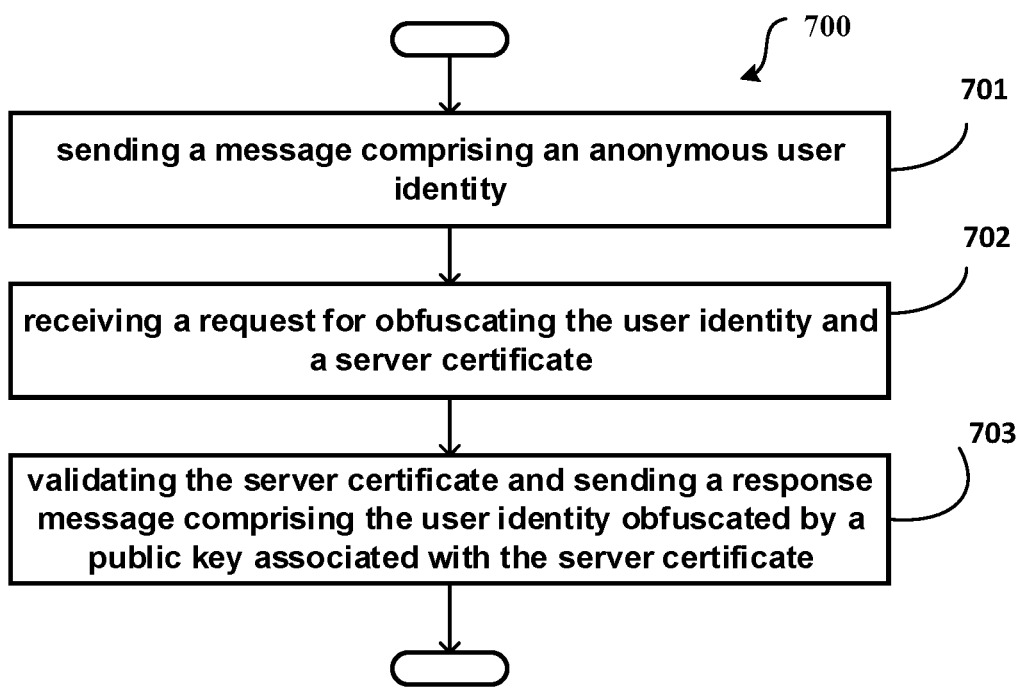
FIG. 7 illustrates an exemplary method at a UE performing authentication for establishing a secure communication using IPP, according to one embodiment.

FIG. 7 illustrates a method 700 at a UE performing authentication for establishing a secure communication using identity privacy protection, IPP, according to one embodiment. In this method, the UE supports IPP and EAP-AKA or EAP-AKA' is used as an authentication method. However other authentication methods may be used. The method 700 can apply to a UE over trusted or untrusted WLAN.

1. For untrusted WLAN access: After performing the IKE_INIT_SA exchange with the ePDG, the UE supporting IPP proceeds to step 901 by sending an IKE_AUTH_request message to the ePDG, where the IKE_AUTH_request message comprises the anonymous user identity included in an IDi payload. A format of the anonymous user identity may be anonymous@nai.epc.mnc<MNC>.mcc<MCC>.3gppnetwork.org. The IKE_AUTH_request message may also include a request for a certificate by including a CERTREQ payload in the IKE message. In response to the IKE_AUTH_Request message, the UE receives at step 902 an IKE_AUTH Response message.

A) If the ePDG does not support IPP, but the AAA server responsible for authenticating the user supports IPP, the IKE_AUTH response message includes an EAP-request/AKA-identity which includes an indication or an instruction for the UE to send the user identity obfuscated over the WiFi access. The IKE_AUTH response message additionally includes the server certificate. In this case, it is the AAA server certificate. The instruction to request the obfuscated user identity may be an attribute and an example format of the attribute is illustrated in FIG. 10a. Additionally the server certificate may be included in a separate attribute, and FIG. 10c illustrates an example format for the attribute. The UE at step 903, first validates the server certificate by determining whether the certificate belongs to the UE's trusted Certificate Authority, CA, list and/or contains the UE's operator or partner operators. If the certificate belongs to UE's trusted CA, list and/or contains UE's operator or partner operators, the UE 100 accepts the received certificate and determines that it should provide an obfuscated user identity based on the instruction received in the IKE_AUTH response. The UE 100 encrypts the user identity (e.g., IMSI, MSISDN, SUPI, etc.) using the public key of the received server certificate and sends it in the EAP-response/AKA-identity message payload within an IKE_AUTH_Request message. FIG. 10b illustrates an example of the obfuscated user identity attribute format, where the attribute is presented as the AT_OBFUSCATED_ID attribute.

Format of obfuscated user identity in the AT_OBFUSCATED_ID attribute.

Example of the Obfuscated User Identity Format is as Follows:

"0<identity>@nai.epc.mnc<MNC>.mcc<MCC>.3gppnetwork.org" for EAP AKA authentication For obfuscated user identity, the identity is the value of obfuscated IMSI value or the like of the user.

Subsequent authentication steps correspond to authentication steps 4-15 of FIG. 1 (prior art).

B) If the ePDG supports IPP: the IKE_AUTH response message includes the ePDG certificate also referred to as server certificate and a calculated authentication code. In EAP-AKA, the authentication code corresponds to the calculated AUTH. The UE first validates the server certificate by determining whether the certificate belongs to the UE's trusted Certificate Authority, CA, list and/or contains the UE's operator or partner operators. If the certificate belongs to UE's trusted CA list and/or contains UE's operator or partner operators, the UE 100 accepts the received certificate and calculates its own authentication code (i.e., own AUTH value). If the own AUTH matches the AUTH value received from the ePDG then the UE determines that it can trust the ePDG in which case the UE then resumes the normal EAP-AKA over IKEv2 by sending a subsequent IKE_AUTH_Request message, this time containing the real user identity non-obfuscated (corresponding to executing steps 2-15 from FIG. 1 (prior art)).

If on the other hand the UE determines the server certificate is not valid because the certificate does not belong to the trusted CA list or does not contain UE's operator or partner operator, it determines that the ePDG cannot be trusted and may abort the communication with the ePDG. Additionally, if the UE determines that its own calculated AUTH value does not match with the ePDG provided AUTH value, it determines that the ePDG cannot be trusted because of a potential man in the middle eavesdropper and may also abort the communication with the ePDG.

2. For trusted WLAN access: After connecting to a PWAN node in the trusted WLAN and receiving an EAP request/Identity, the UE supporting IPP proceeds to step 901 by sending an EAP response/identity message to the PWAN node, where the EAP response/identity message comprises the anonymous user identity. A format of the anonymous user identity may be anonymous@nai.epc.mnc<MNC>.mcc<MCC>.3gppnetwork.orq. The EAP response/identity message may also include a request for a certificate by including a CERTREQ attribute. In response to the EAP response/identity message, the UE receives at step 902 an EAP request/AKA'-identity message which includes an indication or an instruction for the UE to send the user identity obfuscated over the WiFi access. The EAP request/AKA'-identity message additionally includes the server certificate. In this case, it is the AAA server certificate. The instruction to send the user identity may be an attribute and an example format of the attribute is illustrated in FIG. 10a. Additionally the server certificate may be included in a separate attribute, and FIG. 10c illustrates an example format of the attribute. The UE at step 903, first validates the server certificate by determining whether the certificate belongs to the UE's trusted Certificate Authority, CA, list and/or contains the UE's operator or partner operators. If the certificate belongs to UE's trusted CA, list and/or contains UE's operator or partner operators, the UE accepts the received certificate and determines that it should provide an obfuscated user identity based on the instruction received in the EAP request/AKA' identity message. The UE then encrypts the user identity (e.g., IMSI, MSISDN, or SUPI, etc.) using the public key of the received server certificate and sends it back in the EAP-response/AKA'-identity message payload. FIG. 10b illustrates an example of the obfuscated user identity attribute format, where the attribute is presented as the AT_OBFUSCATED_ID attribute.

Format of obfuscated user identity in the AT_OBFUSCATED_ID attribute

Example of the obfuscated user identity format is as follows:

"6<identity>@nai.epc.mnc<MNC>.mcc<MCC>.3gppnetwork.org" for EAP AKA' authentication For obfuscated user identity, the identity is the value of obfuscated IMSI value or the like of the user.

Subsequent authentication steps correspond to authentication steps 10a-24 of the authentication flow as described 3GPP TS 33.402 clause 6.2 "Authentication and key agreement for trusted access".

Figure 8:
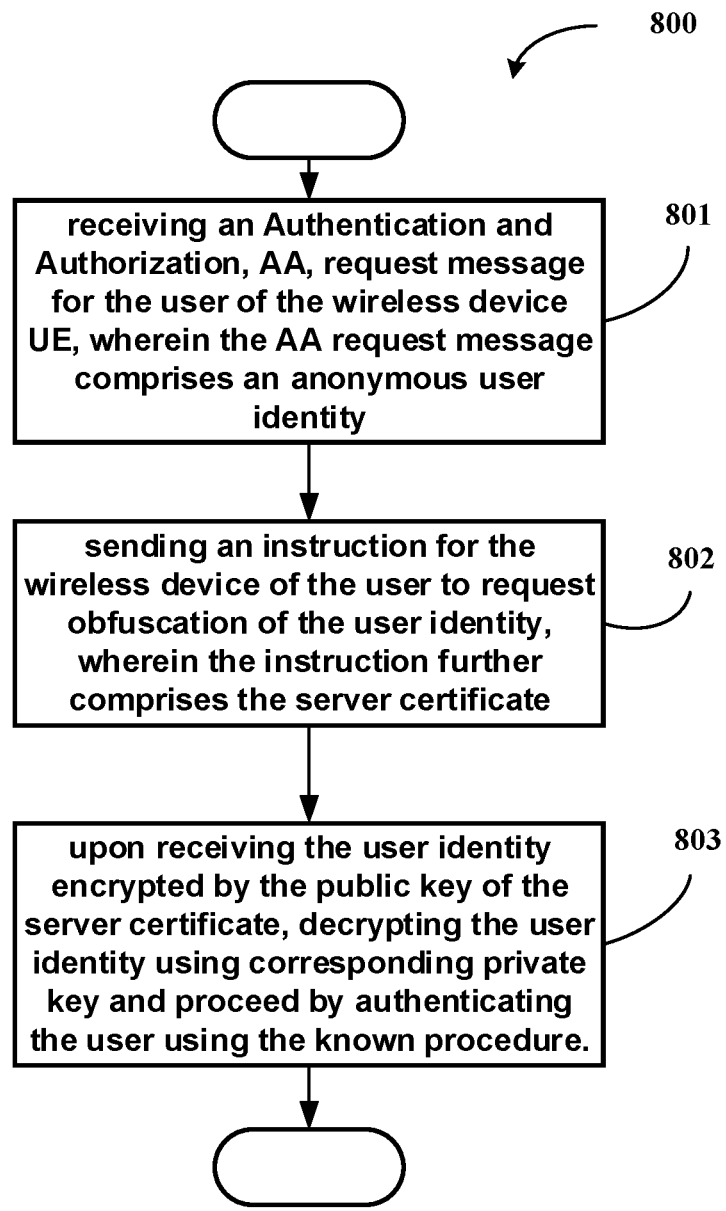
FIG. 8 illustrates an exemplary method at a server performing UE authentication for establishment of a secure communication from the UE to the operator's network, using IPP, according to one embodiment.

FIG. 8 illustrates a method 800 at a AAA server performing authentication for establishing a secure communication using identity privacy protection, IPP, according to one embodiment. In this method, the AAA server supports IPP and EAP-AKA or EAP-AKA' is used as an authentication method. As will be appreciated by one of ordinary skill in the art, other authentication methods may also be used.

At step 801, the AAA server receives a DER message containing the user name AVP comprising anonymous user identity and an EAP response/identity that also includes anonymous user identity. The AAA server determines that the request is received for a UE that requests IPP. A format of the anonymous user identity may be anonymous@nai.epc.mnc<MNC>.mcc<MCC>.3gppnetwork.org. At step 802, the AAA server responds with a DEA message comprising an EAP request/AKA identity or AKA' identity message which includes an instruction to the UE to send the user identity obfuscated over the WiFi access. The EAP request/AKA identity or AKA' identity message in the DEA message additionally includes the server certificate. In this case, it is the AAA server certificate. The instruction to request the obfuscated user identity may be represented by an attribute and an example format for the attribute is illustrated in FIG. 10a. Additionally the server certificate may be included in a separate attribute, and FIG. 10c illustrates an example format of the server certificate attribute. At step 803, The AAA server receives a subsequent DER message that includes an EAP response/AKA identity or AKA' identity which includes encrypted or obfuscated user identity (e.g., IMSI, MSISDN, or SUPI etc.), where the identity was encrypted by the UE using the public key of the server certificate. FIG. 10b illustrates an example of the obfuscated user identity attribute format, where the attribute is presented as the AT_OBFUSCATED_ID attribute.

Format of obfuscated user identity in the AT_OBFUS-CATED_ID attribute:

Example of the obfuscated user identity format is as follows:

"0<identity>@nai.epc.mnc<MNC>.mcc<MCC>.
3gppnetwork.org" for EAP AKA authentication.

For obfuscated user identity, the identity that is obfuscated is for example the IMSI, MSISDN or SUPI or similar. The server decrypts the obfuscated user identity using the corresponding private key. The AAA server then proceeds with the authentication procedure in accordance with the steps 4-15 of FIG. 1 (prior art) for untrusted WLAN using EAP-AKA as the authentication method or in accordance with steps 10a to 24 of the authentication procedure described 3GPP TS 33.402 clause 6.2 "Authentication and key agreement for trusted access" for trusted WLAN and using EAP-AKA' as the authentication method.

Figure 9:
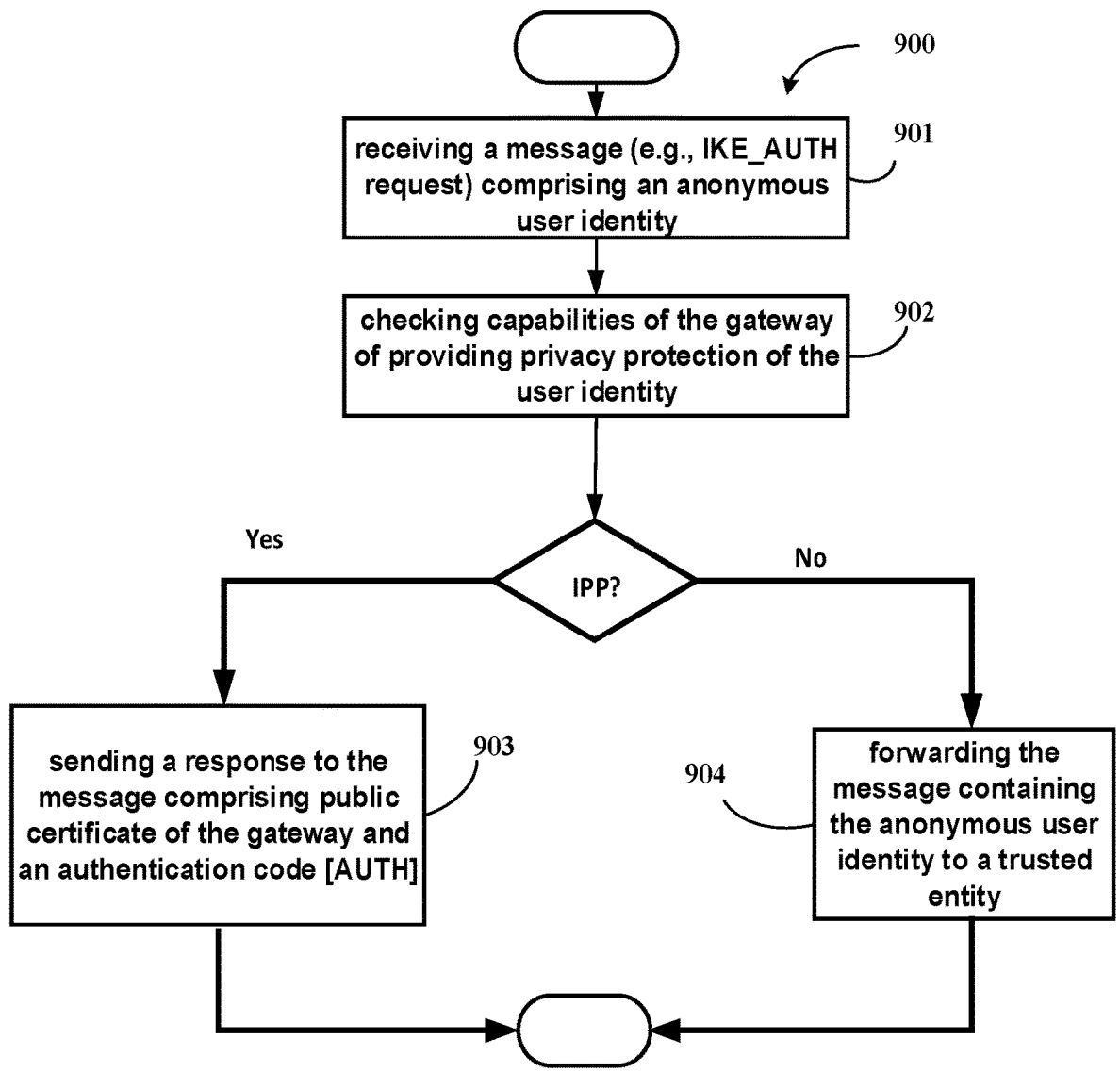
FIG. 9 illustrates an exemplary method at a gateway supporting IPP, according to one embodiment.

FIG. 9 illustrates a method 900 at a security gateway supporting IPP and providing for a UE secure access to a core network according to one embodiment. The security gateway may be an ePDG or an N3IWF. At step 901, the security gateway after performing the initial IKE exchange with the UE (i.e., IKE_INIT_SA exchange as per IETF IKE v2 protocol or as per step 1 of FIG. 1 (prior art)), receives an IKE_AUTH request message from the UE comprising the anonymous user identity which may be included in an IDi payload. A format of the anonymous user identity may be anonymous@nai.epc.mnc<MNC>.mcc<MCC>.
3gppnetwork.ora. The IKE_AUTH_request message may also include a request for a certificate if a CERTREQ payload in the IKE message is included. In response to the IKE_AUTH_Request message, the ePDG at step 902 determines if it supports IPP and/or if it has a certificate to provide to the UE. If the ePDG supports IPP and/or has a certificate, it does not proceed with authentication with the AAA backend server right away and instead sends to the UE at step 903 an IKE_AUTH Response message that includes the ePDG certificate also referred to as server certificate. At this point the ePDG proceeds with authentication steps 2-15 of FIG. 1 (Prior art) where at step 2, it receives another IKE_AUTH request message from the UE, this time containing the real identity of the user from the UE, if the UE determined that it can trust the ePDG. The identity may be obfuscated and encrypted with the public key of the server certificate, in which case the ePDG will be able to decrypt it. If the ePDG does not support IPP and/or does not have a certificate, it forwards at step 904 the received anonymous identity in a DER message to the AAA backend server and upon receiving a DEA message from the AAA server where the DEA contains the EAP request/AKA Identity, the ePDG sends at step 903 the EAP request/AKA identity which also comprises the AAA/server certificate and an instruction to obfuscate the user identity. The ePDG relays the authentication messages between the UE and the AAA backend server and receives the real user identity from the back end AAA server.

FIG. 10a illustrates an embodiment of an instruction sent from the AAA (EAP) server to the EAP client (UE) to request the UE to provide an obfuscated user identity in subsequent messages. The instruction is represented by an EAP attribute AT_OBFUSCATED_ID_REQ. The value of AT_OBFUSCAED_ID_REQ will be assigned by IANA. The attribute is included in the EAP request message.

FIG. 10b illustrates an embodiment of the obfuscated user identity sent from the UE (EAP client) to the AAA server (EAP server) in an EAP message as an EAP attribute. The EAP attribute AT_OBFUSCATED_ID attribute is used to transport the obfuscated or encrypted user identity. The value of AT_OBFUSCATED_ID will be assigned by IANA and the actual obfuscated identity length field indicates the length of the obfuscated user identity in octets.

FIG. 10c illustrates an embodiment of an EAP attribute AT_CERT attribute for carrying the AAA server certificate from EAP server (AAA) server to the EAP client (UE). The value of AT_CERT will be assigned by IANA. The Length field is two octets and indicates the length (in octet) of the AT_CERT attribute including the AT_CERT, Length, N, CP Length and CP. The N field indicate the next certificate payload. When N field is zero, it means the following certificate payload is the last one. Otherwise, a chain of certificates may be provided in which case there is one more certificate payload included in the same EAP message. The certificate payload, CP, length field indicates the length (in octet) of the certificate. The CP field includes one single DER-encoded X.509 certificate. If a chain of certificates is included in the attribute, N field, CP length field and CP field will be repeated but only the first CP holds the public key.

Figure 11:
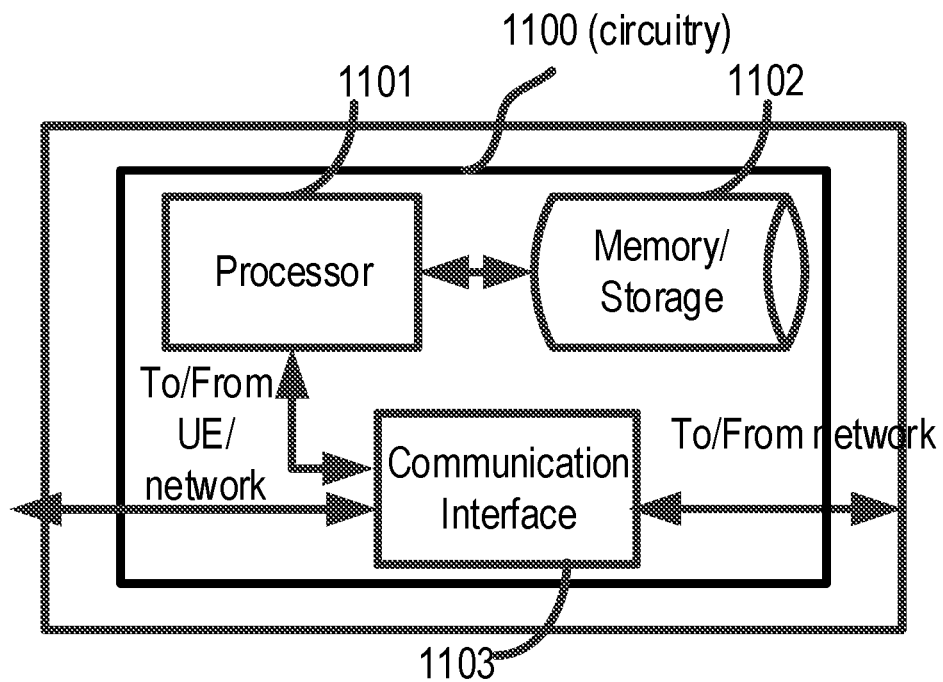
FIG. 11 illustrates a circuitry of a network node (AAA server or gateway) according to one embodiment.
Figure 14:
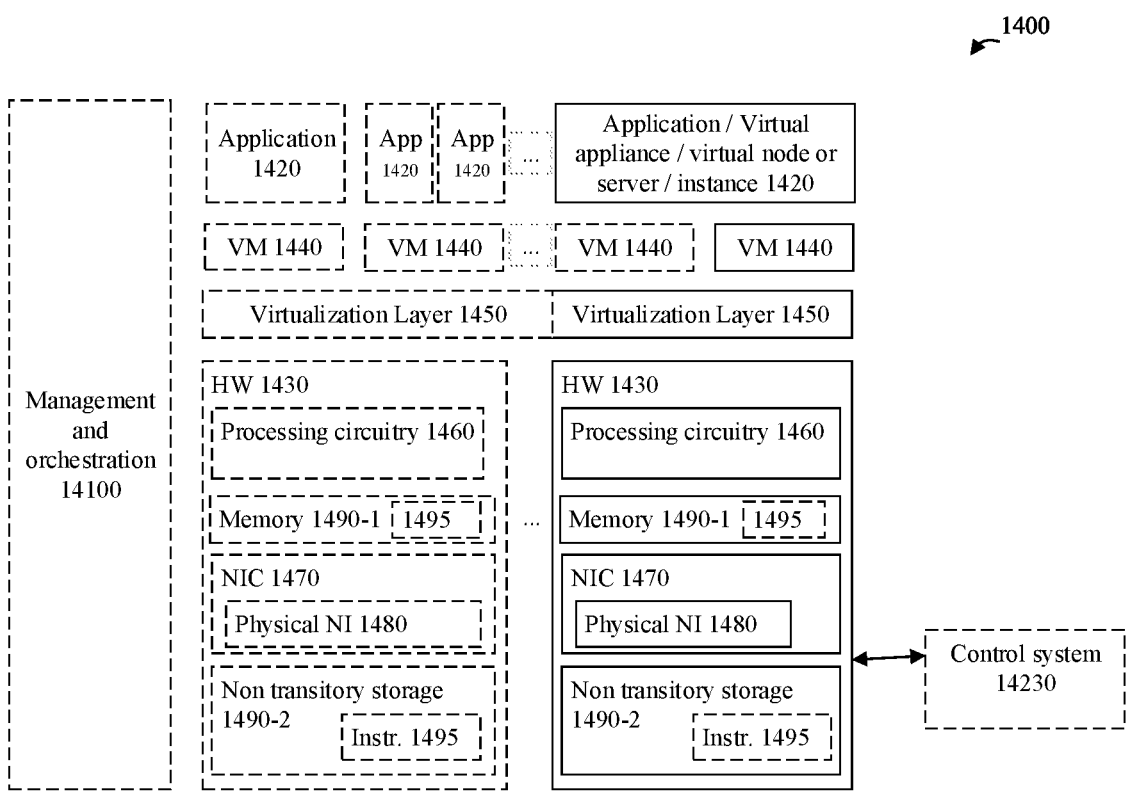
FIG. 14 illustrates a virtualization environment in which functions according to some embodiment(s) may be implemented.

FIG. 11 illustrates embodiments of a network node (101 or 102) where the network node may be an ePDG or a AAA server. If the network node is a AAA server (102), the embodiment of FIG. 11 comprises a circuitry 1100 which executes the method steps according to the embodiments as described in FIG. 8, along with steps 504, 505 and 508 of FIG. 5 and steps 401, 402 and 405 of FIG. 4 in addition to other embodiments described herein. In one embodiment, the circuitry 1100 may comprise a processor 1101 and a storage 1102 (also referred to as memory) containing instructions, which when executed, cause the processor 1101 to perform the steps in a method according to embodiments described herein. The circuitry 1100 may further comprise a communication interface 1103 to communicate with external entities such as communicating with ePDG 101 or PWAN node 101bis using Diameter or similar protocol to transport EAP messages to/from the AAA server 102 and the EAP peer in the UE 100. The embodiments described herein can also be executed in a virtualized embodiment of the AAA server 102. As used herein, a "virtualized" AAA server 102 is an implementation of the AAA server in which at least a portion of the functionality of the AAA server is implemented as virtual component(s) (e.g., via a virtual machine(s) executing on a physical processing node(s) in a network(s)). FIG. 14 illustrates an example of a virtualized AAA.

If the network node is a gateway such as an ePDG (101) (or N3IWF 101') supporting UE access to the core network over untrusted WLAN, the embodiment of FIG. 11 comprises a circuitry 1100 which executes the method steps according to the embodiments as described in FIG. 9, along with steps 1, 400-405 of FIG. 4 and steps 1, 120 and 121 of FIG. 3 in addition to other embodiments described herein. In one embodiment, the circuitry 1100 may comprise a processor 1101 and a storage 1102 (also referred to as memory) containing instructions, which when executed, cause the processor 1101 to perform the steps in a method according to embodiments described herein. The circuitry 1100 may further comprise a communication interface 1103 to communicate with other network entities such as a AAA server 102 and a PGW 103. The embodiments described herein can also be executed in a virtualized embodiment of the ePDG 101. As used herein, a "virtualized" ePDG 101 is an implementation of the ePDG 101 in which at least a portion of the functionality of the ePDG 101 is implemented as virtual component(s) (e.g., via a virtual machine(s) executing on a physical processing node(s) in a network(s)). FIG. 14 illustrates an example of a virtualized ePDG.

If the network node is a gateway such as PWAN 101*bis* supporting UE access to the core network over trusted WLAN, the embodiment of FIG. 11 comprises a circuitry 1100 which performs the embodiments as described in FIG. 6 in addition to other embodiments described herein. In one embodiment, the circuitry 1100 may comprise a processor 1101 and a storage 1102 (also referred to as memory) containing instructions, which when executed, cause the processor 1101 to perform the steps in accordance with embodiments described herein. The circuitry 1100 may further comprise a communication interface 1103 to communicate with other network entities such as a AAA server 102 and a PGW 103. The embodiments described herein can also be executed in a virtualized embodiment of the PWAN 101*bis*. As used herein, a "virtualized" PWAN 101*bis* is an implementation of the PWAN 101*bis* in which at least a portion of the functionality of the PWAN 101*bis* is implemented as virtual component(s) (e.g., via a virtual machine(s) executing on a physical processing node(s) in a network(s)). FIG. 14 illustrates an example of a virtualized PWAN gateway.

Figure 12:
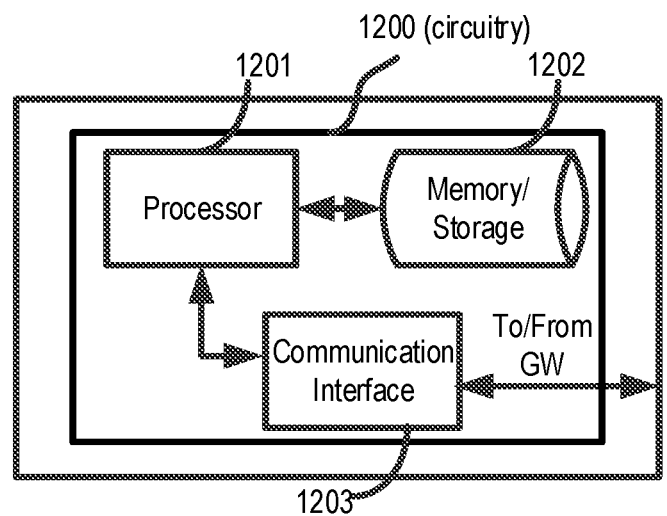
FIG. 12 illustrates a circuitry of a UE according to one embodiment

FIG. 12 is a block diagram of an exemplary wireless device (UE) 100, in accordance with certain embodiments. Wireless device 100 includes circuitry which may comprise a transceiver, one or more processors, and memory. In some embodiments, the transceiver facilitates transmitting wireless signals to and receiving wireless signals from the WLAN (e.g., via an antenna), and transmit and receive data to and from an ePDG 101/N3IWF 101' over the SWu/NGu interface (IKE/IPsec tunnel). The one or more processors execute instructions to provide some or all of the functionalities described herein as being provided by wireless device 100, and the memory stores the instructions for execution by the one or more processors.

The one or more processors may include any suitable combination of hardware and software implemented in one or more modules to execute instructions and manipulate data to perform some or all of the described functions of the wireless device 100 such as steps 1, 120, 121 of FIG. 3, step 1, 400, 403 and 404 of FIG. 4, steps 501-503 and 506, 507 of FIG. 5, steps 1, 120 and 121*b* of FIG. 6 and method 700 in FIG. 7. In some embodiments, the one or more processors may include, for example, one or more computers, one or more central processing units (CPUs), one or more processors, one or more applications, one or more application specific integrated circuits (ASICs), one or more field programmable gate arrays (FPGAs) and/or other logic. In certain embodiments, the one or more processors may comprise one or more modules implemented in software. The module(s) provide functionality of the wireless device 100 in accordance with the embodiments described herein, and in accordance with the steps executed at the wireless device 100. In some embodiments, a computer program including instructions which, when executed by at least one processor, causes the at least one processor to carry out the functionality of the wireless device 100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

The memory is generally operable to store instructions, such as a computer program, software, an application including one or more of logic, rules, algorithms, code, tables, etc. and/or other instructions capable of being executed by one or more processors. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the one or more processors of wireless device 100.

Other embodiments of wireless device 100 may include additional components beyond those shown in FIG. 12 that may be responsible for providing certain aspects of the wireless device's functionality, including any of the functionality described above and/or any additional functionality (including any functionality necessary to support the solution described above). As just one example, wireless device 100 may include input devices and circuits, output devices, and one or more synchronization units or circuits, which may be part of the one or more processors. Input devices include mechanisms for entry of data into wireless device 100. For example, input devices may include input mechanisms, such as a microphone, input elements, a display, etc. Output devices may include mechanisms for outputting data in audio, video and/or hard copy format. For example, output devices may include a speaker, a display, etc.

Figure 13:
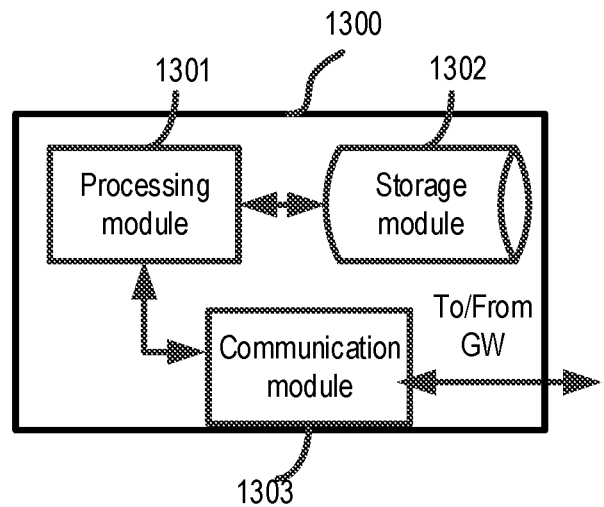
FIG. 13 illustrates a circuitry of a UE according to another embodiment.

FIG. 13 is another embodiment of a block diagram of wireless device (UE) 100 in accordance with another embodiment. The wireless device 100 comprises a processing module 1301 that sends through a communication module 1303 a message comprising an anonymous user identity. The processing module 1301 receives through the communication module 1303 a request that contains an instruction for obfuscating the user identity and a server certificate. The processing module 1301 stores in the memory/storage module 1302 the server certificate and the corresponding public key and validates the server certificate. If the validation is positive, the processing module 1301 encrypts the user identity using the public key associated with the server certificate and sends through the communication module 1303 a response message comprising the obfuscated user identity. The memory/storage module 1302 maintains the server certificate and public key.

FIG. 14 is a schematic block diagram illustrating a virtualization environment 1400 in which functions such as implemented by some embodiment(s) may be virtualized. As used herein, virtualization can be applied to a node such as ePDG 101, N3IWF 101', PWAN 101*bis* or AAA server 102 as described herein and relates to an implementation in which at least a portion of the functionality is implemented as a virtual component(s) (e.g., via application(s)/component(s)/function(s) or virtual machine(s) executing on a physical processing node(s) in a network(s)).

In some embodiments, some or all of the functions described herein may be implemented as virtual components executed by one or more virtual machines implemented in a virtual environment(s) hosted by the hardware node(s) 1430. Further, in embodiments in which the virtual node is not a radio access node or does not require radio connectivity (e.g., a core network node), then the network node may be entirely virtualized.

The functions may be implemented by an application 1420 (which may alternatively be called a software instance, a virtual appliance, a network function, a virtual node, or a virtual network function) operative to implement steps of some method(s) according to some embodiment(s). The application 1420 runs in a virtualization environment 1400 which provides hardware 1430 comprising processing circuitry 1460 and memory 1490. The memory contains instructions 1495 executable by the processing circuitry 1460 whereby the application 1420 is operative to execute the method(s) or steps of the method(s) previously described in relation with some embodiment(s).

The virtualization environment 1400, comprises a general-purpose or special-purpose network hardware device(s) 1430 comprising a set of one or more processor(s) or processing circuitry 1460, which may be commercial off-the-shelf (COTS) processors, dedicated Application Specific Integrated Circuits (ASICs), or any other type of processing circuitry including digital or analog hardware components or special purpose processors. The hardware device(s) comprises a memory 1490-1 which may be a transitory memory for storing instructions 1495 or software executed by the processing circuitry 1460. The hardware device(s) comprise network interface controller(s) 1470 (NICs), also known as network interface cards, which include physical Network Interface 1480. The hardware device(s) also includes non-transitory machine readable storage media 1490-2 having stored therein software 1495 and/or instruction executable by the processing circuitry 1460. Software 1495 may include any type of software including software for instantiating the virtualization layer or hypervisor, software to execute virtual machines 1440 as well as software allowing to execute functions described in relation with some embodiment(s) described previously.

Virtual machines 1440, implement virtual processing, virtual memory, virtual networking or interface and virtual storage, and may be run by the virtualization layer or hypervisor 1450. Different embodiments of the instance or virtual appliance 1420 may be implemented on one or more of the virtual machine(s) 1440, and the implementations may be made in different ways.

During operation, the processing circuitry 1460 executes software 1495 to instantiate the hypervisor or virtualization layer, which may sometimes be referred to as a virtual machine monitor (VMM). The hypervisor 1450 may present a virtual operating platform that appears like networking hardware to virtual machine 1440. As shown in the FIG. 14, hardware 1430 may be a standalone network node, with generic or specific hardware. Hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in Data centers, and customer premise equipment.

In the context of NFV, a virtual machine 1440 is a software implementation of a physical machine that runs programs as if they were executing on a physical, non-virtualized machine. Each of the virtual machines 1440, and that part of the hardware 1430 that executes that virtual machine, be it hardware dedicated to that virtual machine and/or time slices of hardware temporally shared by that virtual machine with others of the virtual machine(s) 1440, forms a separate virtual network element(s) (VNE).

Still in the context of NFV, Virtual Network Function (VNF) is responsible for handling specific network functions that run in one or more virtual machines on top of the hardware networking infrastructure and corresponds to application 1420 in FIG. 14.

In some embodiments, some signaling can be effected with the use of a control system 14230 which may alternatively be used for communication between the hardware node(s) 1430 and between the hardware units 1430 and external unit(s).

While not being limited thereto, some example embodiments of the present disclosure are provided below.

embodiment 1. A method of operation (700) of a wireless device (100), for providing user identity privacy when establishing a connection to a network over a wireless local area network, WLAN, the method comprising:
  sending a message comprising an anonymous user identity;
  receiving a request for obfuscating the user identity wherein the request comprises a server certificate; and
  validating the server certificate and sending a response message comprising the user identity obfuscated by a public key associated with the server certificate.

embodiment 2. The method of embodiment 1 wherein the message is an Internet Key Exchange IKE_Authentication request message and the anonymous user identity is included in the identification initiator, IDi, payload.

embodiment 3. The method of embodiment 1, where in the message is sent in response to an identity request by the network.

embodiment 4. The method of embodiment 1 wherein the step of validating the server certificate further comprises verifying the server certificate belongs to a trusted Certificate Authority, CA, list and contains the wireless device operator or partner operators.

embodiment 5. The method of embodiment 1, wherein the message further comprises a request for the server certificate.

embodiment 6. A wireless device (100), comprising:
  at least one transceiver;
  at least one processor; and
  memory comprising instructions executable by the at least one processor whereby the wireless device (100) is operable to:
    send a message comprising an anonymous user identity;
    receive a request for obfuscating the user identity wherein the request comprises a server certificate; and
    validate the server certificate and send a response message comprising the user identity obfuscated by a public key associated with the server certificate.

embodiment 7. A wireless device (100) adapted to:
  send a message comprising an anonymous user identity;
  receive a request for obfuscating the user identity wherein the request comprises a server certificate; and validate the server certificate and send a response message comprising the user identity obfuscated by a public key associated with the server certificate.

embodiment 8. The wireless device (100) of embodiment 7 wherein the wireless device (100) is further adapted to operate according to the method of any one of embodiment 2 to 5.

embodiment 9. A method of operation (800) of a server (102) in a network for enabling privacy of a user identity when a user of a wireless device requests connection to the network, the method comprising:
- receiving an Authentication and Authorization, AA, request message for the user of the wireless device, wherein the AA request message comprises an anonymous user identity;
- sending an instruction for the wireless device of the user to request obfuscation of the user identity, wherein the instruction further comprises a certificate for the server; and
- upon receiving the user identity encrypted by a public key associated with the server certificate, decrypting the user identity using corresponding private key and authenticating the user.

embodiment 10. The method of embodiment 9 where in the step of sending the instruction for the wireless device of the user to request obfuscation of the user identity is in response to determining that identity privacy protection is enabled.

embodiment 11. The method of embodiment 9, where the instruction is comprised in an AA response message.

embodiment 12. A server, (102) in a network, comprising:
- at least one processor; and
- memory comprising instructions executable by the at least one processor whereby the N3IWF (103) is operable to:
  - receive an Authentication and Authorization, AA, request message for a user of a wireless device (100), wherein the AA request message comprises an anonymous user identity;
  - send an instruction for the wireless device of the user to request obfuscation of the user identity, wherein the instruction further comprises a certificate for the server; and
  - upon receipt of the user identity encrypted by a public key associated with the certificate, decrypt the user identity using corresponding private key and authenticate the user.

embodiment 13. A server, (102) in network, adapted to:
- receive an Authentication and Authorization, AA, request message for a user of a wireless device (100), wherein the AA request message comprises an anonymous user identity;
- send an instruction for the wireless device of the user to request obfuscation of the user identity, wherein the instruction further comprises a certificate for the server; and
- upon receipt of the user identity encrypted by a public key associated with the certificate, decrypt the user identity using corresponding private key and authenticate the user.

embodiment 14. The server (102) of embodiment 13 wherein the server (102) is further adapted to operate according to the method of any one of embodiments 10-11.

embodiment 15. A method of operation (900) of a gateway (101) in a network for enabling privacy protection of a user identity when a user of a wireless device requests connection to the network, the method comprising:
- receiving a message comprising an anonymous user identity;
- checking capabilities of the gateway of providing privacy protection of the user identity;
- sending a response to the message comprising public certificate of the gateway and an authentication code when the capabilities indicate support for privacy protection of the user identity; and
- forwarding the message to a trusted entity when the capabilities indicate non-support for privacy protection of the user identity, wherein the message comprises the anonymous user identity.

embodiment 16. The method of embodiment 15, where the message further comprises a request for the public certificate of the gateway.

embodiment 17. A gateway (101) in network, adapted to:
- receive a message comprising an anonymous user identity;
- check capabilities of the gateway to provide privacy protection of the user identity;
- send a response to the message comprising public certificate of the gateway and an authentication code when the capabilities indicate support for privacy protection of the user identity; and
- forward the message to a trusted entity (102) when the capabilities indicate non-support for privacy protection of the user identity, wherein the message comprises the anonymous user identity.

embodiment 18. A method of operation of a wireless device (100), for providing user identity privacy when establishing a connection to a network over a wireless local area network, WLAN, the method comprising:
- sending a first message comprising an anonymous user identity;
- receiving a response message comprising a server certificate and an authentication code; and
- validating the server certificate and the authentication code and sending a second message comprising the user identity.

embodiment 19. The method of embodiment 18 wherein the step of validating the server certificate further comprises verifying the server certificate belongs to a trusted Certificate Authority, CA, list and contains the wireless device operator or partner operators.

embodiment 20. The method of embodiment 18 wherein the step of validating the authentication code further comprises calculating the wireless device own authentication code and determining that the wireless device own authentication code matches the authentication code received in the response message.

embodiment 21. The method of embodiment 18, wherein the first message further comprises a request for the server certificate.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitation.

What is claimed:

1. A method of operation of a wireless device, for providing privacy of a user identity when establishing a connection to a network over a non-third generation partnership project (non-3GPP) access network, the method comprising:
   sending a message, over the non-3GPP access network, comprising an anonymous user identity;
   receiving a request for obfuscating the user identity corresponding to sending the message, wherein the request comprises a server certificate; and
   validating the server certificate and sending a response message comprising the user identity obfuscated by a public key associated with the server certificate.

2. The method of claim 1, wherein the message is an Internet Key Exchange (IKE) Authentication request message and the anonymous user identity is included in an identification initiator (IDi) payload.

3. The method of claim 1, wherein the message is sent in response to an identity request by the network.

4. The method of claim 1, wherein the step of validating the server certificate further comprises verifying that the server certificate belongs to a trusted Certificate Authority (CA) list and contains at least one of an operator of the wireless device or one or more partner operators of the wireless device.

5. The method of claim 1, wherein the message further comprises a request for the server certificate.

6. A wireless device configured to provide privacy of a user identity during a connection establishment with a network over a non-third generation partnership project (non-3GPP) access network, the wireless device comprising:
   at least one transceiver;
   at least one processor; and
   memory comprising instructions executable by the at least one processor whereby the wireless device is operable to:
   send a message, over the non-3GPP access network, comprising an anonymous user identity;
   receive a request to obfuscate the user identity corresponding to sending the message, wherein the request comprises a server certificate; and
   validate the server certificate and send a response message comprising the user identity obfuscated by a public key associated with the server certificate.

7. A method of operation of a server in a network for enabling privacy of a user identity when a wireless device of a user requests a connection to the network, the method comprising:
   receiving, over a non-3GPP access network, an Authentication and Authorization (AA) request message for the wireless device, wherein the AA request message comprises an anonymous user identity;
   sending an instruction for the wireless device to request obfuscation of the user identity responsive to receiving the AA request message, wherein the instruction further comprises a certificate of the server; and
   upon receiving the user identity encrypted by a public key associated with the certificate of the server, decrypting the user identity using a corresponding private key and authenticating the user.

8. The method of claim 7, wherein the step of sending the instruction for the wireless device to request obfuscation of the user identity is in response to determining that identity privacy protection is enabled.

9. The method of claim 7, wherein the instruction is comprised in an AA response message.

* * * * *